US010389282B2

(12) United States Patent
Tsukii et al.

(10) Patent No.: US 10,389,282 B2
(45) Date of Patent: Aug. 20, 2019

(54) DC POWER SUPPLY UNIT AND AIR CONDITIONER USING SAME

(71) Applicant: Hitachi-Johnson Controls Air Conditioning, Inc., Minato-ku, Tokyo (JP)

(72) Inventors: Koji Tsukii, Tokyo (JP); Atsushi Okuyama, Tokyo (JP); Tsutomu Kurokawa, Tokyo (JP); Masahiro Tamura, Tokyo (JP); Kenji Tamura, Tokyo (JP)

(73) Assignee: Hitachi-Johnson Controls Air Conditioning, Inc., Tokyo (JP)

( * ) Notice: Subject to any disclaimer, the term of this patent is extended or adjusted under 35 U.S.C. 154(b) by 0 days.

(21) Appl. No.: 15/052,934

(22) Filed: Feb. 25, 2016

(65) Prior Publication Data

US 2017/0070157 A1 Mar. 9, 2017

(30) Foreign Application Priority Data

Sep. 7, 2015 (JP) .................................. 2015-175832

(51) Int. Cl.
*H02M 7/04* (2006.01)
*H02P 7/24* (2006.01)
*H02M 1/42* (2007.01)

(52) U.S. Cl.
CPC ............ *H02P 7/24* (2013.01); *H02M 1/4225* (2013.01); *H02M 1/4233* (2013.01); *Y02B 70/126* (2013.01)

(58) Field of Classification Search
CPC .... H02M 1/4225; H02M 1/4233; H02M 7/04; H02M 7/219; H02M 2007/2195; H02P 7/24

(Continued)

(56) References Cited

U.S. PATENT DOCUMENTS

| 6,421,262 B1* | 7/2002 | Saxelby ................. H01L 24/40 363/127 |
| 2012/0014139 A1* | 1/2012 | Yamada .............. H02M 1/4208 363/17 |

(Continued)

FOREIGN PATENT DOCUMENTS

| CN | 101584107 A | 11/2009 |
| CN | 102396143 A | 3/2012 |

(Continued)

OTHER PUBLICATIONS

Korean-language Office Action issued in counterpart Korean Application No. 10-2016-0022300 dated Jul. 3, 2017 (Five (5) pages).

(Continued)

*Primary Examiner* — Jeffrey A Gblende
*Assistant Examiner* — Lorena D Bruner
(74) *Attorney, Agent, or Firm* — Crowell & Moring LLP

(57) ABSTRACT

A DC power supply unit is provided that allows for improving efficiency and reducing harmonic currents. A DC power supply unit includes: a bridge rectification circuit having diodes and MOSFETs; a reactor that is arranged between the AC power supply and the bridge rectifier circuit; a smoothing capacitor that is connected to an output side of the bridge rectifier circuit and smoothes a voltage; and a converter control unit that executes, based on predetermined threshold values, a diode rectification control that uses diodes and parasitic diodes of the MOSFETs, a synchronous rectification control that switches the MOSFETs in synchronization with a polarity of the voltage of the AC power supply, a partial switching control that repeats partially short-circuiting the reactor multiple times in a half cycle of the AC power supply, or a fast switching control that short-circuits the reactor at a predetermined frequency over a full AC cycle.

20 Claims, 17 Drawing Sheets

(58) Field of Classification Search
USPC .......................................................... 363/89
See application file for complete search history.

(56) References Cited

U.S. PATENT DOCUMENTS

| | | | | |
|---|---|---|---|---|
| 2012/0092911 | A1* | 4/2012 | Usami | H02M 7/217 |
| | | | | 363/89 |
| 2013/0342139 | A1* | 12/2013 | Shimomugi | H02M 7/066 |
| | | | | 318/400.3 |
| 2016/0172996 | A1* | 6/2016 | Matsui | H02M 1/4233 |
| | | | | 363/89 |
| 2017/0279372 | A1* | 9/2017 | Sakakibara | H02M 7/48 |

FOREIGN PATENT DOCUMENTS

| | | | |
|---|---|---|---|
| CN | 103378754 | A | 10/2013 |
| EP | 2 107 675 | A1 | 10/2009 |
| EP | 2 421 139 | A1 | 2/2012 |
| JP | 2008-61412 | A | 3/2008 |
| KR | 10-2007-0101476 | A | 10/2007 |

OTHER PUBLICATIONS

Chinese-language Office Action issued in counterpart Chinese Application No. 201610101926.9 dated May 9, 2018 (eight pages).

\* cited by examiner

AC power supply
voltage vs

Circuit current is

Driving pulse: Q1

Driving pulse: Q2

AC power supply voltage vs

Circuit current is

Driving pulse: Q1

Driving pulse: Q2

AC power supply voltage vs

Circuit current is

Driving pulse: Q1

Driving pulse: Q2

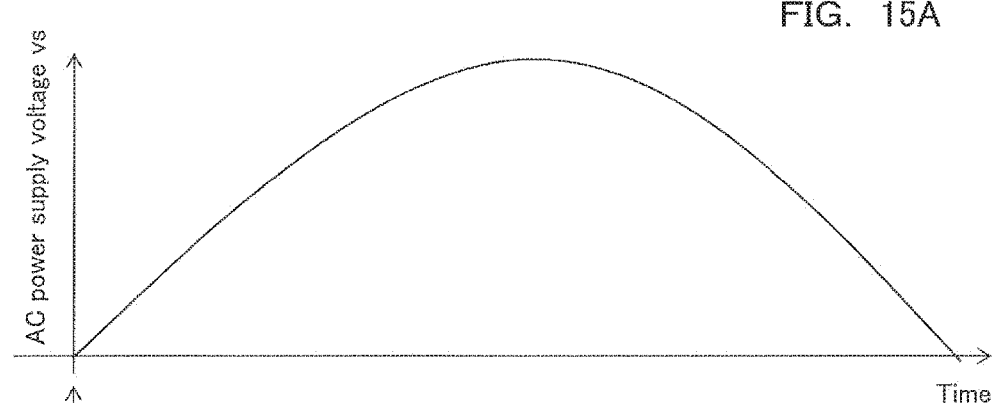
FIG. 15A
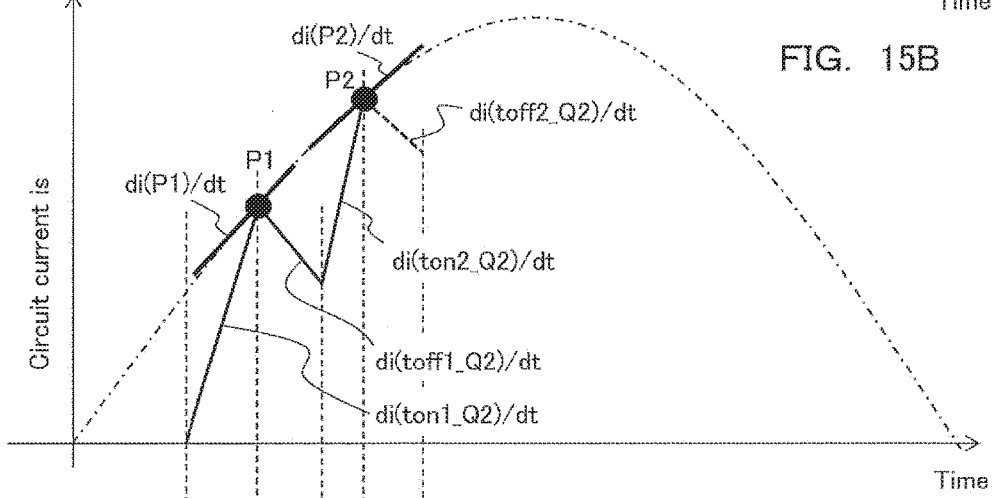
FIG. 15B
FIG. 15C
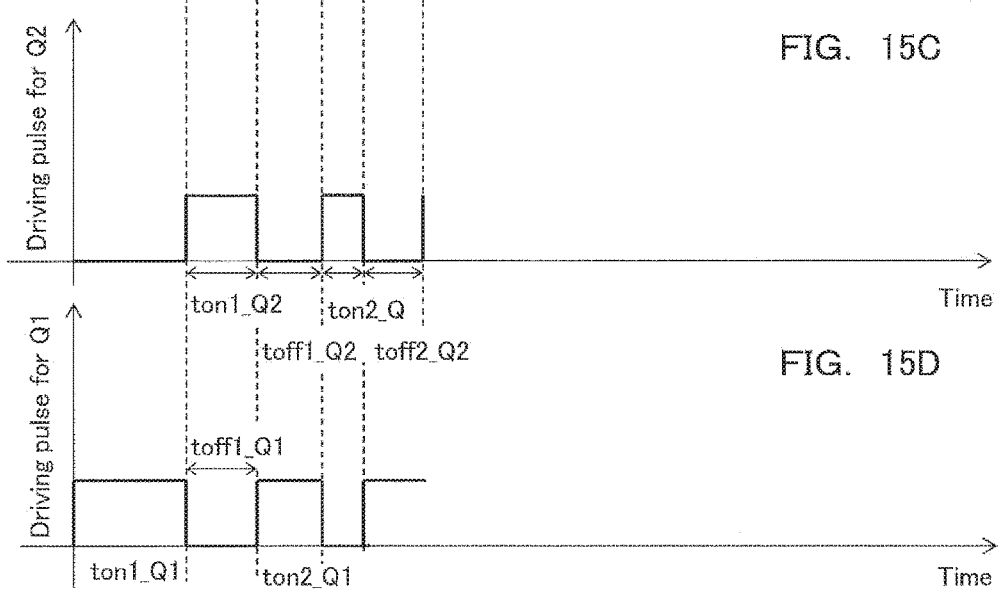
FIG. 15D

FIG. 16

| Load | #1 | #2 | #3 | #4 | #5 | #6 | #7 | #8 |
|---|---|---|---|---|---|---|---|---|
| Large | Synchronous rectification + Partial SW | Synchronous rectification + Fast SW | Synchronous rectification + Fast SW | Diode rectification + Partial SW | Diode rectification + Fast SW | Diode rectification + Fast SW | Synchronous rectification + Fast SW | Diode rectification + Fast SW |
| Threshold Value #2 | | | | | | | | |
| Medium | Synchronous rectification | Synchronous rectification | Synchronous rectification + Partial SW | Diode rectification + Partial SW | | Diode rectification + Partial SW | Diode rectification + Partial SW | Synchronous rectification + Partial SW |
| Threshold Value #1 | | | | | | | | |
| Small | Synchronous rectification | Synchronous rectification | Synchronous rectification | Synchronous rectification | Synchronous rectification | Synchronous rectification | Synchronous rectification | Synchronous rectification |

Partial switching

Fast switching

DC POWER SUPPLY UNIT AND AIR CONDITIONER USING SAME

CROSS-REFERENCE TO RELATED APPLICATION

This application claims the benefit of priority to Japanese Patent Application No. 2015-175832 filed 7 Sep. 2015, the disclosures of all of which are hereby incorporated by reference in their entities.

TECHNICAL FIELD

The present invention relates to a DC power supply unit that converts an AC voltage to a DC voltage, and an air conditioner using the DC power supply unit.

BACKGROUND ART

A train, an automobile, or an air conditioner, for example, is mounted with a DC power supply unit that converts an AC voltage to a DC voltage. The DC power supply unit is used to output a DC voltage, which is then converted by an inverter to an AC voltage having a predetermined frequency so as to be applied to a load such as a motor. Such a DC power supply unit is required to have higher power-conversion efficiency to save energy.

To satisfy the requirement, a synchronous rectifier circuit including a MOSFET (Metal-Oxide-Semiconductor Field-Effect Transistor) is proposed, such as in Japanese Patent Application Publication No. 2008-061412, for a DC power supply unit that converts AC power to DC power.

SUMMARY OF THE INVENTION

Problems to be Solved

In addition to saving energy, a DC power supply unit is required to reduce harmonic currents from the viewpoint of protecting electronic equipment or power distributing and receiving facility, and the power factor needs to be corrected in order to achieve such an objective. Generally, the primary-side power supply is short-circuited to flow a short-circuit current through a circuit for correcting the power factor. For a circuit zone having a large load, the power factor may be insufficiently be corrected by short-circuiting the zone only once, and can sufficiently be corrected by short-circuiting the zone two or more times but this increases a switching loss. Further, in a zone outputting higher power, the power factor is more decreased to cause harmonic currents to have values closer to tolerances, and therefore needs to be corrected more than in a zone outputting lower power.

However, increasing the number of times of short-circuiting leads to increasing the switching loss as described above, and this requires a suitable control for both saving energy and reducing harmonic currents.

Then, the present invention is intended to provide a DC power supply unit that is capable of both having high efficiency and reducing harmonic currents, and to provide an air conditioner using the DC power supply unit.

Solution to Problems

To solve the problems described above, a DC power supply unit according to the present invention includes; a rectifier circuit that is connected to an AC power supply and has first to fourth diodes; a first switching element that is connected in parallel with the third diode, has a withstand voltage characteristic with respect to the direction of the third diode being turned off, and has a saturation voltage lower than forward voltage drops of the first to fourth diodes; a second switching element that is connected in parallel with the fourth diode, has a withstand voltage characteristic with respect to the direction of the fourth diode being turned off, and has a saturation voltage lower than forward voltage drops of the first to fourth diodes; a reactor that is arranged between the AC power supply and the rectifier circuit; a smoothing capacitor that is connected to an output side of the rectifier circuit and smoothes a voltage applied by the rectifier circuit; and a control means that executes a diode rectification control using the first to fourth diodes, a synchronous rectification control that switches between the first and second switching elements in synchronization with a polarity of the voltage of the AC power supply, a partial switching control that repeats partially short-circuiting the reactor to the AC power supply multiple times in a half cycle of the AC power supply, and a fast switching control for short-circuiting the reactor at a predetermined frequency over a full AC cycle.

The other means will be described in detailed description of the embodiments.

Advantageous Effects of the Invention

The present invention allows for providing a DC power supply unit that is capable of both having high efficiency and reducing harmonic currents, and an air conditioner using the DC power supply unit.

BRIEF DESCRIPTION OF THE DRAWINGS

FIGS. 15A-15D are charts illustrating an overview of the partial switching control;

FIG. 16 is a chart illustrating switching of operation modes of the DC power supply unit in accordance with the magnitude of a load;

DETAILED DESCRIPTION OF EMBODIMENTS

Hereinafter, a description will be given in detail of embodiments for implementing the present invention with reference to the drawings.

Figure 1:
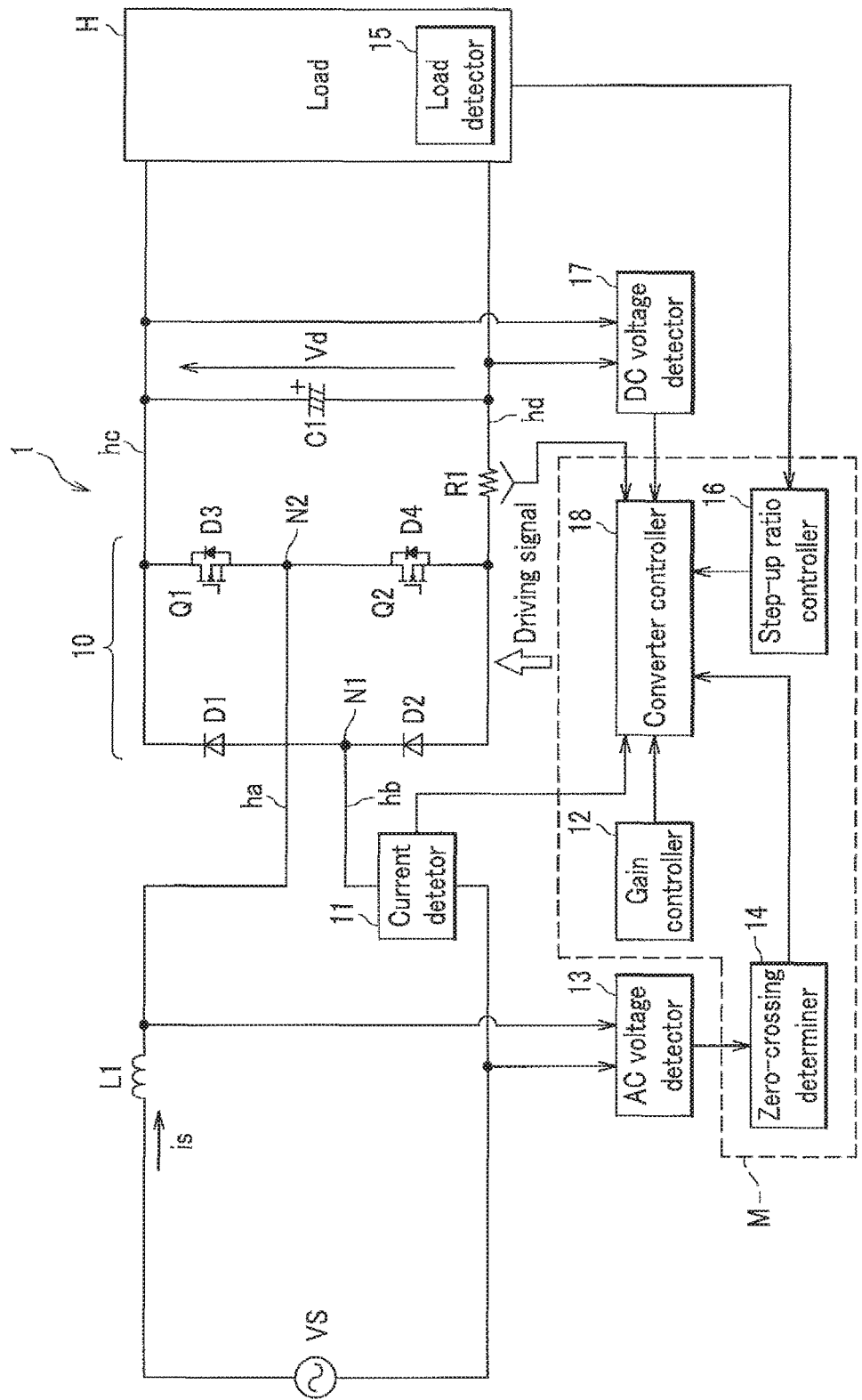
FIG. 1 is a schematic diagram showing a configuration of a DC power supply unit according to a present embodiment.

FIG. 1 is a block diagram of a configuration of a DC power supply unit 1 according to the present embodiment.

As shown in FIG. 1, the DC power supply unit 1 is a converter that converts an AC power supply voltage Vs supplied from the AC power supply VS into a DC voltage Vd and outputs the DC voltage Vd to a load H (such as an inverter or a motor). The DC power supply unit 1 has its input side connected to the AC power supply VS and its output side connected to the load H.

The DC power supply unit 1 includes a reactor L1, a smoothing capacitor C1, diodes D1, D2, D3, D4, MOSFETs Q1, Q2 as switching elements, and a shunt resistor R1. The diodes D1, 02, D3, D4 and the MOSFETs Q1, 02 constitute a bridge rectifier circuit 10.

Note that the MOSFETs Q1, Q2 are the switching elements, the diode D3 is a parasitic diode of the MOSFET Q1, and the diode D4 is a parasitic diode of the MOSFET Q2. In addition, saturation voltages of the MOSFETs Q1, Q2 are lower than forward voltage drops of diodes D1, D2 and the parasitic diodes D3, D4.

The DC power supply unit 1 further includes a current detector 11, a gain controller 12, an AC voltage detector 13, a zero-crossing determiner 14, a load detector 15, a step-up ratio controller 16, a DC voltage detector 17, and a converter controller 18.

The diodes D1, D2 are bridge-connected with the MOSFETs Q1, Q2. The anode of the diode D1 is connected to the cathode of the diode D2 at a connection point N1, which is in turn connected to one end of the AC power supply VS through a wiring hb.

The source of the MOSFET Q1 is connected to the drain of the MOSFET Q2 at a connection point N2. The source of the MOSFET Q1 is connected to the other end of the AC power supply VS via the connection point N2, a wiring ha, and a reactor L1.

The anode of the diode D2 is connected to the source of the MOSFET Q2.

The drain of the MOSFET Q1 is connected to the cathode of the diode D1.

In addition, the cathode of the diode D1 and the drain of the MOSFET Q1 are connected through the wiring hc to the positive electrode of the smoothing capacitor C1 and one end of the load H. Further, the anode of the diode D2 and the source of the MOSFET Q2 are connected through a shunt resistor R1 and a wiring hd to the negative electrode of the smoothing capacitor C1 and the other end of the load H.

The reactor L1 is arranged on the wiring ha, that is, between the AC power supply VS and the bridge rectifier circuit 10. The reactor L1 stores power supplied from the AC power supply VS as energy, and then releases the energy to step up the voltage.

The smoothing capacitor C1 smoothes the voltage rectified through the diode D1 and the MOSFET Q1 as the DC voltage Vd. The smoothing capacitor C1 is connected to the output side of the bridge rectifier circuit 10, to have the positive electrode side connected to the wiring hc and the negative electrode side connected to the wiring hd.

The MOSFETs Q1, Q2 as the switching elements are turned on or off by a command from the converter controller 18 to be described later. The MOSFETs Q1, Q2 are used as the switching elements to allow for switching fast, and further flowing a current through the MOSFETs, which have small voltage drops, allows for executing a so-called synchronous rectification control to reduce a conduction loss in the circuit.

Super junction MOSFETs, which have smaller on-resistances than ordinary MOSFETs, can be used as the MOSFETs Q1, Q2 to further reduce conduction losses. Here, the parasitic diode of the MOSFET is to have a reverse recovery current generated at a time of the circuit being short-circuited. There is a problem that the parasitic diode of the super junction MOSFET particularly has a large reverse recovery current generated relative to the parasitic diode of an ordinary MOSFET, to have a larger switching loss. Then, MOSFETs having a small reverse recovery time (or Trr in short) can be used as the MOSFETs Q1, Q2 to reduce switching losses.

The diodes D1, D2 have no reverse recovery current generated even during active operation, and therefore it is preferable to select those having a smaller forward voltage. For example, a common rectifier diode or a Schottky barrier diode having a high breakdown voltage can be used to reduce a conduction loss in the circuit.

The shunt resistor R1 has a function of detecting an instantaneous current flowing through the circuit.

The current detector 11 has a function of detecting an average current flowing through the circuit.

The gain controller 12 has a function of controlling a current control gain Kp which is determined from a circuit-current effective value Is and a DC voltage step-up ratio "a." Here, a value obtained by multiplying Kp by Is can be controlled to have a predetermined value for stepping up the AC power supply voltage Vs to the DC voltage Vd by "a" times.

The AC voltage detector 13 is used for detecting the AC power supply voltage Vs applied by the AC power supply VS, and is connected to the wirings ha, hb. The AC voltage detector 13 outputs the detected value to the zero-crossing determiner 14.

The zero-crossing determiner 14 has a function of determining the value of the AC power supply voltage Vs detected by the AC voltage detector 13 whether the sign of the value has been changed from positive to negative or vice versa, that is, whether a zero-crossing point has been reached. The zero-crossing determiner 14 is a polarity detector for detecting the polarity of the AC power supply voltage Vs. For example, the zero-crossing determiner 14 outputs a signal of "1" to the converter controller 18 while the AC power supply voltage Vs has a positive value, and outputs a signal of "0" to the converter controller 18 while the AC power supply voltage Vs has a negative value.

The load detector 15 is constituted, for example, with a shunt resistor (not shown), and has a function of detecting a current flowing through the load H. Note that if the load H is an inverter or a motor, load current detected by the load detector 15 may be used to calculate a rotation speed of the motor and/or a voltage applied to the motor. In addition, a DC voltage detected by the DC voltage detector 17, to be described later, and the voltage applied to the motor may be used to calculate a modulation factor of the inverter. The load detector 15 outputs the detected value (e.g., a current, a rotation speed of the motor, or a modulation factor) to the step-up ratio controller 16.

The step-up ratio controller 16 selects the step-up ratio "a" of the DC voltage Vd from the detected value by the load detector 15, and outputs the selection result to the converter controller 18. The converter controller 18 in turn outputs a driving pulse to the MOSFETs Q1, Q2 for executing a switching control so as to step-up the DC voltage Vd to a target voltage.

The DC voltage detector 17 is used for detecting the DC voltage Vd applied to the smoothing capacitor C1, and the positive side is connected to the wiring hc and the negative side is connected to the wiring hd. The DC voltage detector 17 outputs the detected value to the converter controller 18. Note that the value detected by the DC voltage detector 17 is used to determine whether a value of the voltage applied to the load H has reached a predetermined target value.

A block M inclusive of the converter controller 18 is, for example, a microcomputer (not shown) that is arranged to retrieve a program stored in a Read Only Memory (ROM) and load it into a Random Access Memory (RAM) for a Central Processing Unit (CPU) executing various processes. The converter controller 18 controls to turn on or off the MOSFETs Q1, Q2, based on information inputted from the current detector 11 or the shunt resistor R1, the gain controller 12, the zero-crossing determiner 14, the step-up ratio controller 16, and the DC voltage detector 17. Note that processing executed by the converter controller 18 will be described later.

Next, a description will be given of an operation mode of the DC power supply unit 1 of the present invention.

The DC power supply unit 1 has four broad operation modes of a diode rectification mode, a synchronous rectification mode, a partial switching mode, and a fast switching mode. The partial switching mode and the fast switching mode are the modes in which the converter does active operation (power factor correction operation), or flows a current for correcting the power factor through the bridge rectifier circuit 10 to step up the DC voltage Vd and correct the power factor. For example, if a load of an inverter or a motor is high, the DC voltage Vd needs to be stepped up. In addition, as the load increases to have more current flowing through the DC power supply unit 1, the harmonic currents are also increased. Then, if the load is high, the partial switching mode or the fast switching mode needs to be used for stepping up the voltage to reduce the harmonic currents, that is, to correct the power factor of the power supply input.

<Diode Rectification Mode>

The diode rectification mode is the mode in which the four diodes D1 to D4 are used to execute full-wave rectification. In this mode, the MOSFETs Q1, Q2 are in an OFF state.

Figure 2:
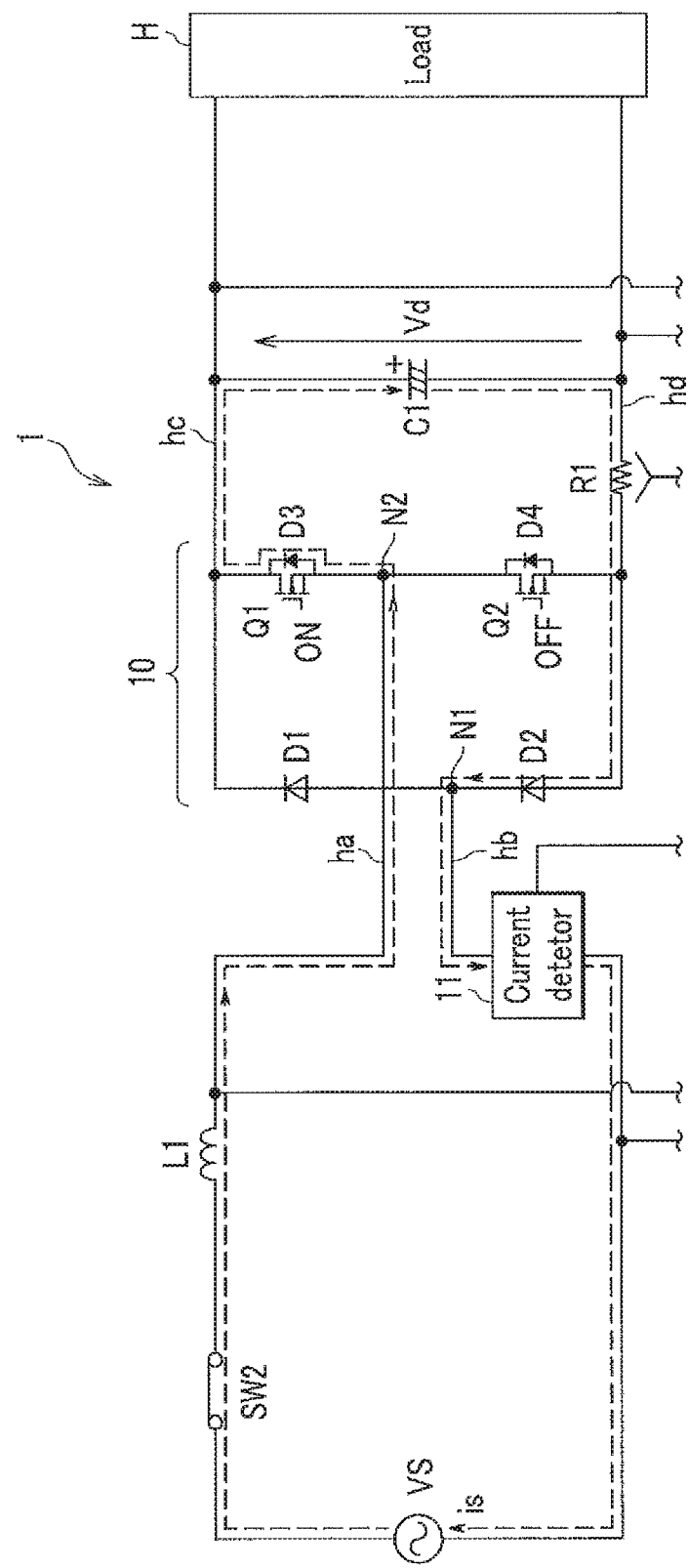
FIG. 2 is a diagram, in a case of the AC power supply voltage having a positive polarity, showing a current path flowing through the circuit under the diode rectification control.

FIG. 2 indicates a current path flowing through the circuit under the diode rectification control, in the case of the AC power supply voltage Vs having a positive polarity.

In FIG. 2, the current flows in the direction indicated by the broken line arrows during a half-cycle while the AC power supply voltage Vs has a positive polarity. That is, the current flows sequentially through the AC power supply VS, the reactor L1, the parasitic diode D3, the smoothing capacitor C1, the shunt resistor R1, the diode D2, and the AC power supply VS.

Figure 3:
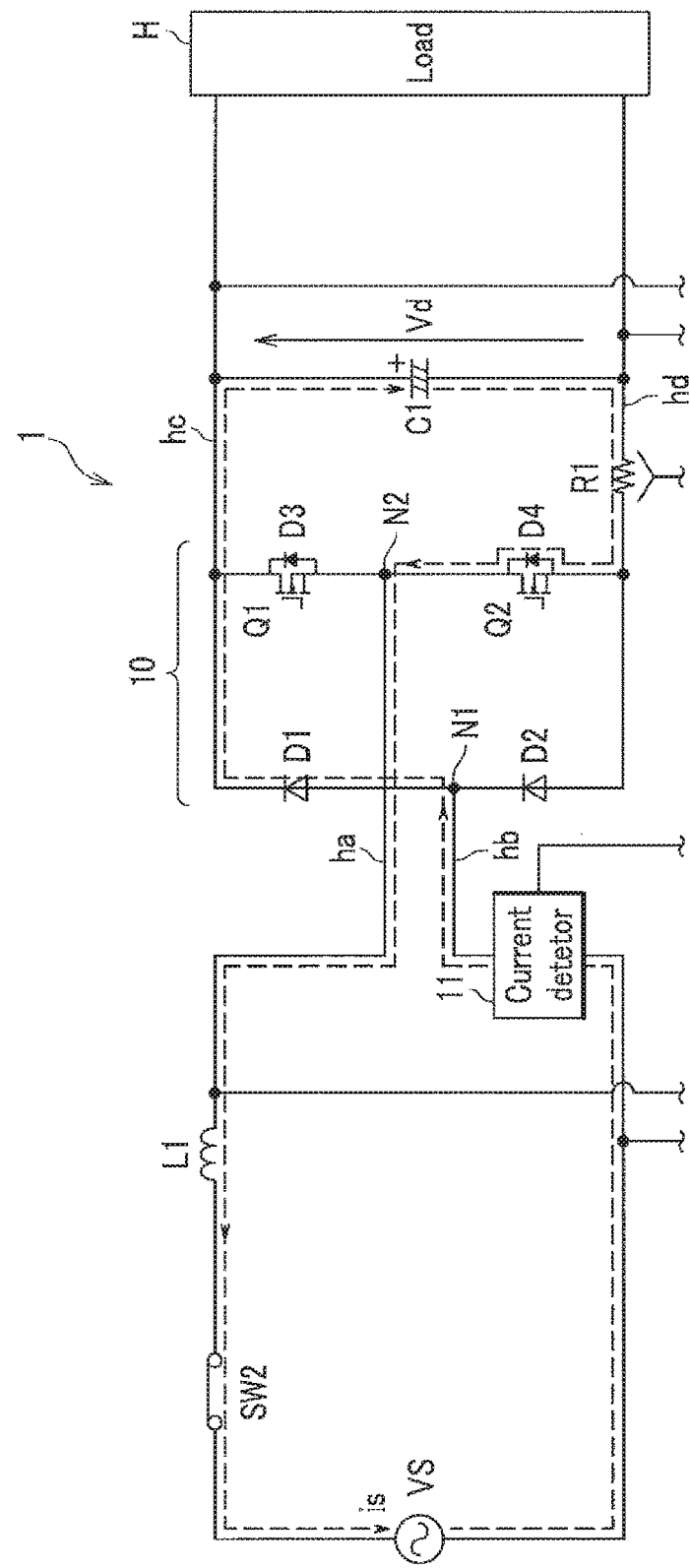
FIG. 3 is a diagram, in a case of the AC power supply voltage having a negative polarity, showing a current path flowing through the circuit under the diode rectification control.

FIG. 3 indicates a current path flowing through the circuit under the diode rectification control, in the case of the AC power supply voltage Vs having a negative polarity.

In FIG. 3, the current flows in the direction indicated by the broken line arrows during a half-cycle while the AC power supply voltage Vs has a negative polarity. That is, the current flows sequentially through the AC power supply VS, the diode D1, the smoothing capacitor C1, the shunt resistor R1, the parasitic diode D4, the reactor L1, and the AC power supply VS.

<Synchronous Rectification Mode>

In order to execute the diode rectification control as described above with high efficiency, the MOSFETs Q1, Q2 are switch-controlled in response to the polarity of the AC supply voltage Vs, to execute the synchronous rectification control.

Figure 4:
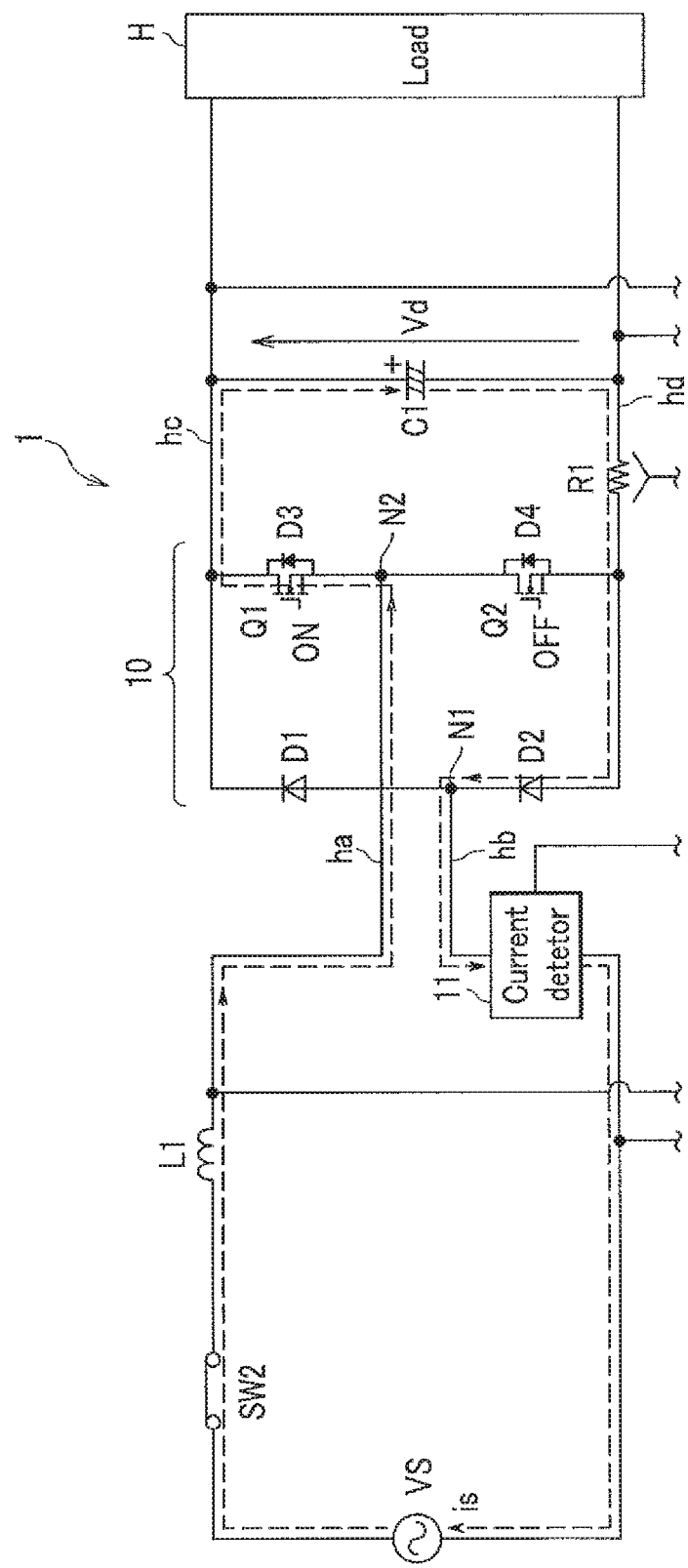
FIG. 4 is a diagram, in a case of the AC power supply voltage having a positive polarity, showing a current path flowing through the circuit under the synchronous rectification control.

FIG. 4 is a diagram, in the case of the AC power supply voltage Vs having the positive polarity, showing a current path flowing through the circuit under the synchronous rectification control.

In FIG. 4, the current flows in the direction indicated by the broken line arrows during a half-cycle while the AC power supply voltage Vs has the positive polarity. That is, the current flows sequentially through the AC power supply VS, the reactor L1, the MOSFET Q1, the smoothing capacitor C1, the shunt resistor R1, the diode D2, and the AC power supply VS. During this time, the MOSFET Q2 is normally in an OFF-state and the MOSFET Q1 is normally in an ON-state. If the MOSFET Q1 is not in an ON-state, the current flows through the parasitic diode D3 of the MOSFET Q1 as previously described in the diode rectification operation. However, the forward voltage drop across a parasitic diode of a MOSFET is generally large to have a large conduction loss. Then, the MOSFET Q1 is turned on to flow a current through an ON-resistance of the MOSFET Q1 for reducing the conduction loss. This is the principle of the so-called synchronous rectification control. Note that the MOSFET Q1 is turned on at a zero-crossing time when the polarity of the AC power supply voltage Vs switches from negative to positive. The MOSFET Q1 is turned off at a time when the polarity of the AC power supply voltage Vs switches from positive to negative.

Figure 5:
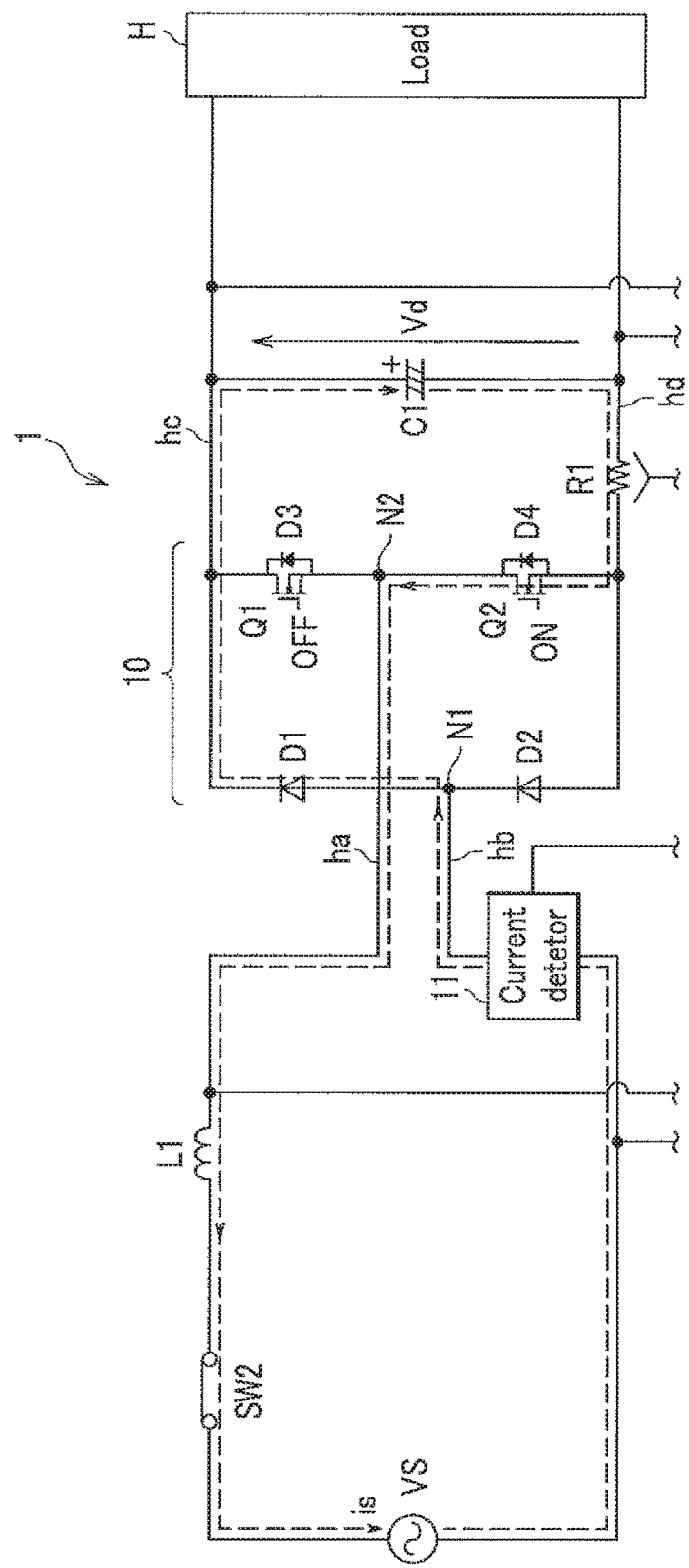
FIG. 5 is a diagram, in a case of the AC power supply voltage having a negative polarity, showing a current path flowing through the circuit under the synchronous rectification control.

FIG. 5 is a diagram, in the case of the AC power supply voltage Vs having the negative polarity, showing a current path flowing through the circuit under the synchronous rectification control.

In FIG. 5, the current flows in the direction indicated by the broken line arrows during the half-cycle while the AC power supply voltage Vs has the negative polarity. That is, the current flows sequentially through the AC power source VS, the diode D1, the smoothing capacitor C1, the shunt resistor R1, the MOSFET Q2, the reactor L1, and the AC power supply VS. During this time, the MOSFET Q1 is normally in an OFF-state and the MOSFET Q2 is normally in an ON-state. Note that the MOSFET Q2 is turned on at a zero-crossing time when the polarity of the AC power supply voltage Vs switches from positive to negative. The MOSFET Q2 is turned off at a time when the polarity of the AC power supply voltage Vs switches from negative to positive.

The DC power supply unit can be operated as described above to have high efficiency.

FIGS. 6A-6D are waveform charts of the power supply voltage Vs, the circuit current "is," and driving pulses for the MOSFETs, respectively, under the synchronous rectification control.

Figure 6A:
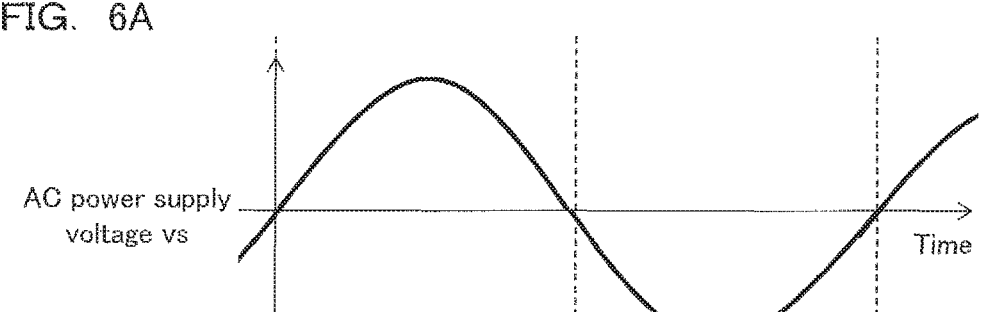
FIGS. 6A-6D are waveform charts of a power supply voltage, a circuit current, and driving pulses for MOSFETs, respectively, under the synchronous rectification control.
Figure 6B:
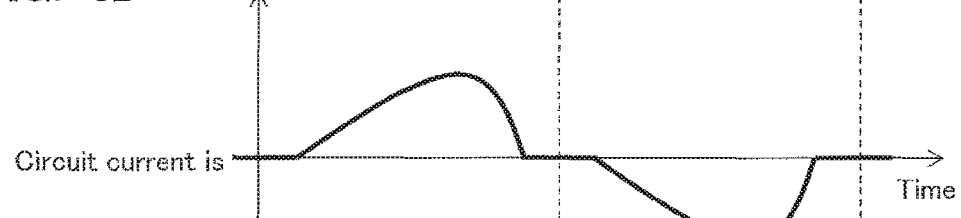
Figure 6C:
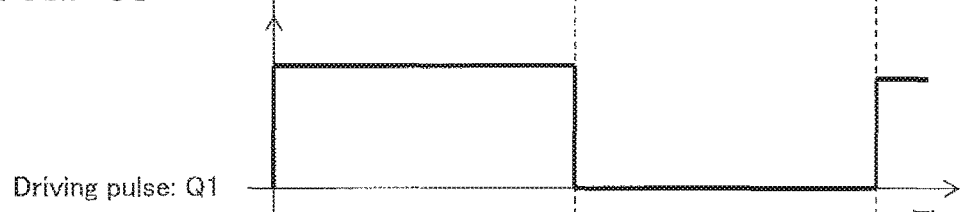
Figure 6D:
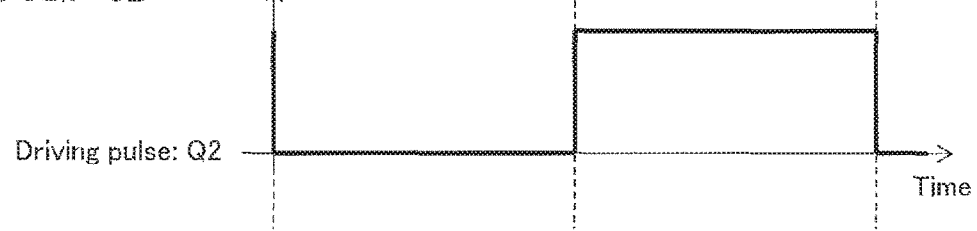

FIG. 6A shows a waveform of the instantaneous value "vs" of the AC power supply voltage and FIG. 6B shows a waveform of the circuit current "is." FIG. 6C shows a waveform of the driving pulse for the MOSFET Q1 and FIG. 6D shows a waveform of the driving pulse for the MOSFET Q2.

As shown in FIG. 6A, the instantaneous value "vs" of the AC power supply voltage is substantially a sinusoidal waveform.

As shown in FIG. 6C, the driving pulse for the MOSFET Q1 is at an H-level while the AC supply voltage Vs has the positive polarity, and at an L-level while the AC supply voltage Vs has the negative polarity.

As shown in FIG. 6D, the driving pulse for the MOSFET Q2 is inverted from the driving pulse for the MOSFET Q1, to have the L-level while the AC power supply voltage Vs has the positive polarity and the H-level while the AC power supply voltage Vs has the negative polarity.

As shown in FIG. 6B, the circuit current "is" flows if the AC power supply voltage Vs reaches a predetermined magnitude, that is, if the AC power supply voltage Vs is larger than the DC voltage Vd.

<Fast Switching Operation>

Next, a description will be given of fast switching operation that steps up, and corrects the power factor of, the DC voltage Vd.

In this operation mode, the MOSFETs Q1, Q2 are switch-controlled at a certain switching frequency to short-circuit the circuit via the reactor L1 (hereinafter, referred to as power-factor correction operation) so as to flow a short-circuit current (hereinafter, referred to as the power-factor correction current) through the circuit for stepping up, and correcting the power factor of, the DC voltage Vd. First, a description will be given of the operation when the power-factor correction current is flown.

If the synchronous rectification control is made during a cycle in which the AC power supply voltage Vs has the positive polarity, the current flows as shown in FIG. 4 and the MOSFETs Q1, Q2 operate as described above. During this time, as shown in FIG. 6B, the circuit current "is" is distorted with respect to the power supply voltage. This is caused by the fact that the current flows only when the DC voltage Vd is smaller than the AC power supply voltage Vs, and by the characteristics of the reactor L1.

Then, the power-factor correction current is flown through the circuit two or more times for making the circuit current to have a waveform closer to a sine wave, to correct the power factor and to reduce harmonic currents.

Figure 7:
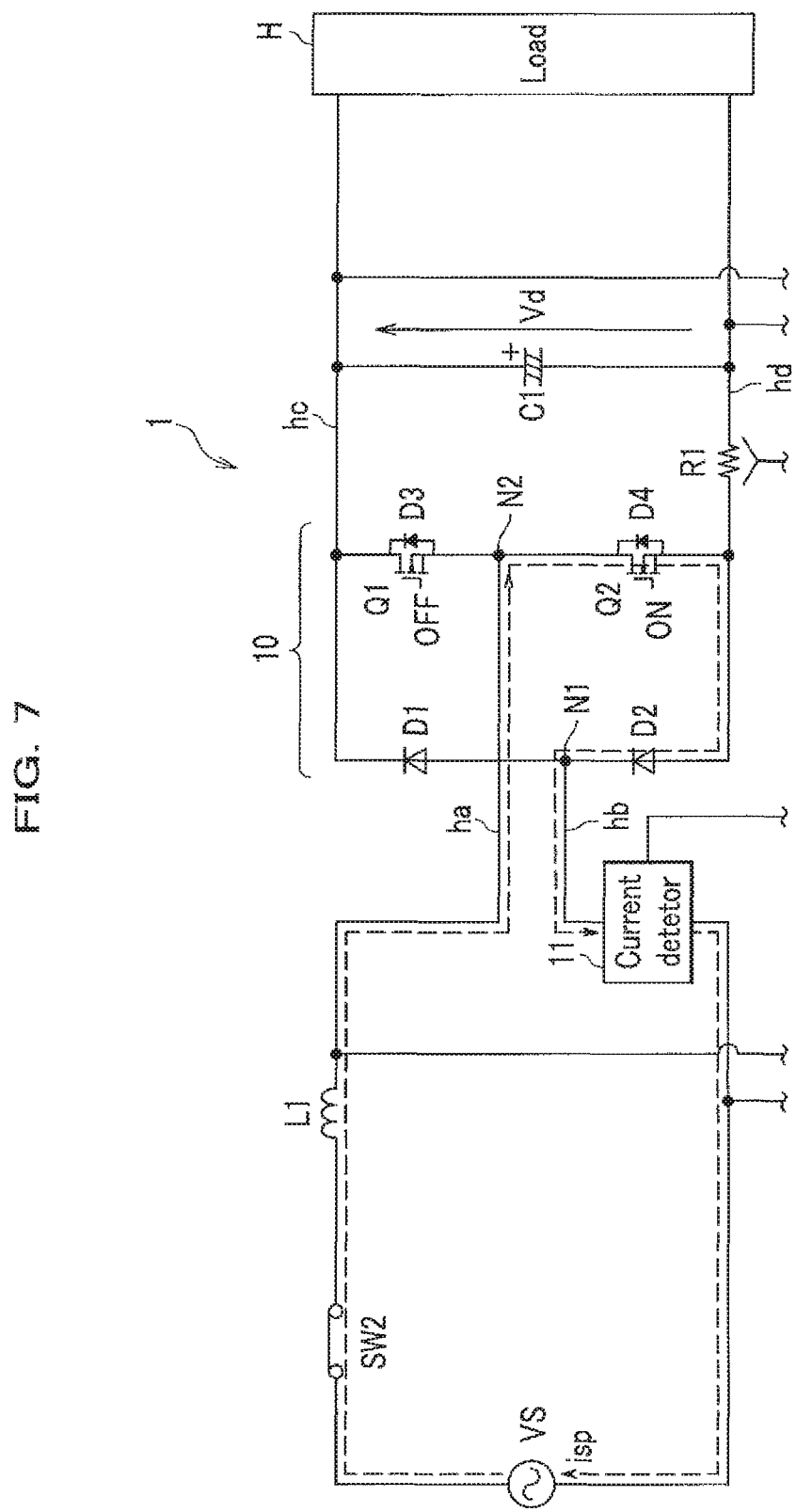
FIG. 7 is a diagram, in a case of the AC power supply voltage having a positive polarity; showing a current path flowing through the circuit while the power factor is being corrected.

FIG. 7 is a diagram showing the path of the power-factor correction current "isp" that flows when the MOSFET Q2 is turned on during a cycle in which the power supply voltage has the positive polarity.

The short-circuit current "isp" flows sequentially through a route of the AC power supply VS, the reactor L1, the MOSFET Q2, the diode D2, and the AC power source VS. During this time, the reactor L1 stores energy represented by following Equation (1). This energy is released to the smoothing capacitor C1 to step up the DC voltage Vd.

$$W = \frac{1}{2} \cdot L1 \cdot I_{sp}^2. \tag{1}$$

If the synchronous rectification control is made during a cycle in which the AC power supply voltage Vs has the negative polarity, the current flows as shown in FIG. 5 and the MOSFETs Q1, Q2 operate as described above.

Figure 8:
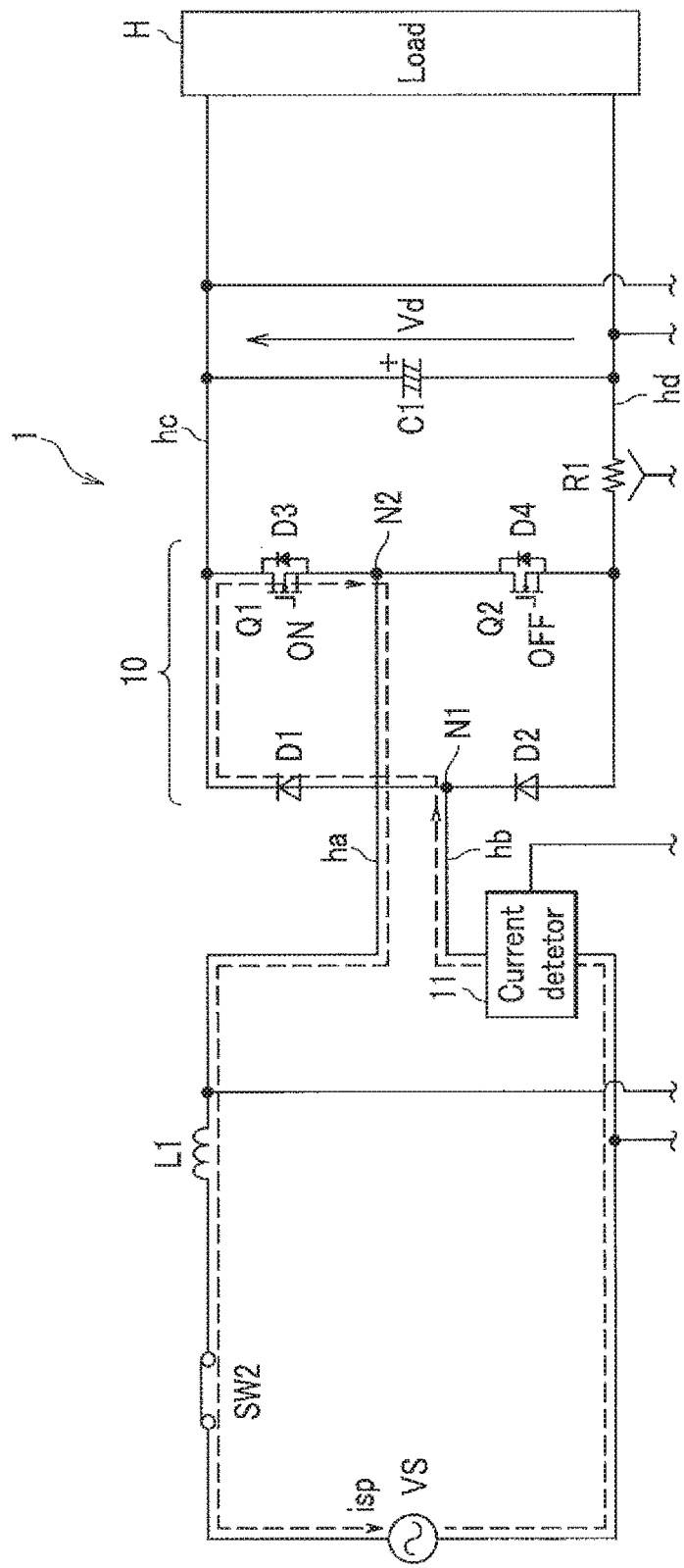
FIG. 8 is a diagram, in a case of the AC power supply voltage having a negative polarity, showing a current path flowing through the circuit while the power factor is being corrected.

FIG. 8 is a diagram showing the path of the power-factor correction current "isp" that flows when the MOSFET Q1 is turned on during a cycle in which the power supply voltage has the negative polarity.

The current flows sequentially through a route of the AC power supply VS, the diode D1, the MOSFET Q1, the reactor L1, and the AC power source VS. During this time, the reactor L1 stores the energy as described above, and then the energy is used to step up the DC voltage Vd.

FIGS. 9A-9D are waveform diagrams of the AC power supply voltage Vs, the circuit current "is," and driving pulses for the MOSFETs, in the case where the power-factor correction current has been flown twice (referred to as two shots).

Figure 9A:
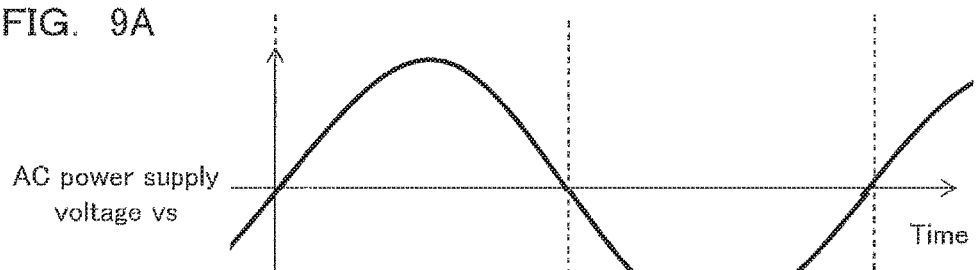
FIGS. 9A-9D are waveform charts of the power supply voltage, the circuit current, and driving pulses for the MOSFETs, respectively, under the partial switching control (with two shots)
Figure 9B:
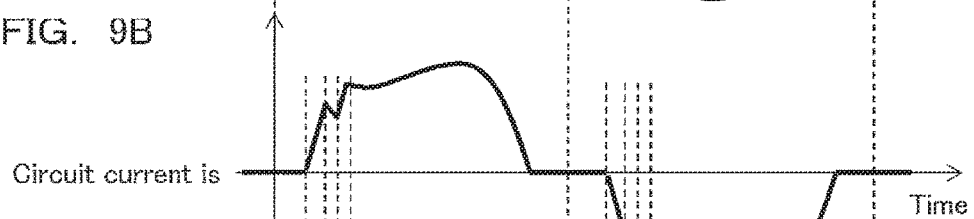
Figure 9C:
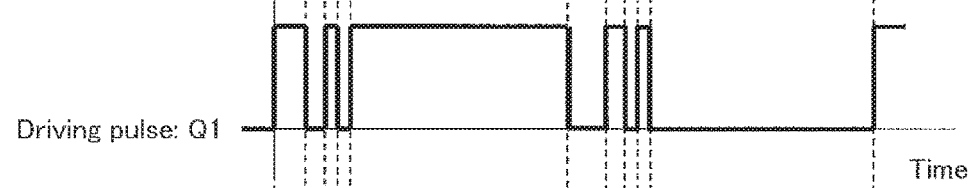
Figure 9D:
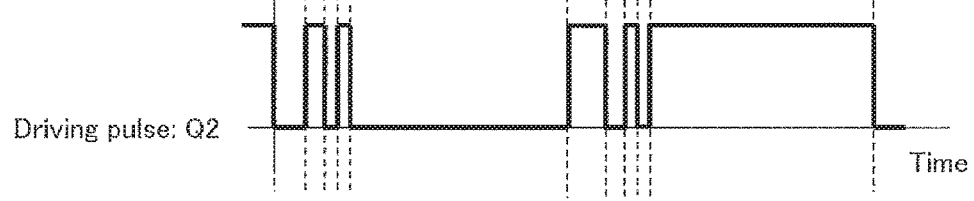

FIG. 9A shows a waveform of the instantaneous value "vs" of the AC power supply voltage and FIG. 9B shows a waveform of the circuit current "is." FIG. 9C shows a waveform of the driving pulse for the MOSFET Q1 and FIG. 9D shows a waveform of the driving pulse for the MOSFET Q2.

As shown in FIG. 9A, the instantaneous value "vs" of the AC power supply voltage substantially indicates a sinusoidal waveform.

As shown in FIG. 9C, the driving pulse for the MOSFET Q1 is at the H-level while the AC power supply voltage Vs has the positive polarity, except for being at the L-level twice at predetermined timings. The driving pulse is at the L-level while the AC power supply voltage Vs has the negative polarity, except for being at the H-level twice at predetermined timings.

As shown in FIG. 9C, the driving pulse for the MOSFET Q2 is inverted from the driving pulse for the MOSFET Q1. This is because the power-factor correction operation is combined with the synchronous rectification control. For example, in a case where the AC power supply voltage Vs has the positive polarity, the MOSFET Q2 is turned on to execute the power-factor correction operation. Then, after the MOSFET Q1 is turned off, the synchronous rectification control is executed while the MOSFET Q2 is turned on. Thus, the power-factor correction operation is combined with the synchronous rectification operation, to allow for executing highly efficient operation while executing the power-factor correction operation.

As shown in FIG. 9B, the circuit current "is" rises when the AC power supply voltage Vs has the positive polarity and the driving pulse for the MOSFET Q2 is changed to the H-level, and rises when the AC power supply voltage Vs has the negative polarity and the driving pulse for the MOSFET Q1 is changed to the H-level. In this way, the power factor is corrected.

For example, if the AC power supply voltage Vs has the positive polarity, the current path while the power factor correction is in operation is as shown in FIG. 7. The current path is as shown in FIG. 4 when the MOSFET Q2 is turned off and the MOSFET Q1 is turned on to switch the mode to the synchronous rectification operation.

Note that the power-factor correction operation may be combined with the above-mentioned diode rectification operation. That is, if the AC power supply voltage Vs has the positive polarity, the current path is as shown in FIG. 7 while the power factor correction is in operation. After the MOSFET Q2 is turned off, the current path is as shown in FIG. 2 when the parasitic diode D3 is turned on to switch the mode to the diode rectifying operation.

FIGS. 10A-10D are waveform diagrams of the AC power source voltage Vs, the circuit current "is," and driving pulses for the MOSFETs under the fast switching control.

Figure 10A:
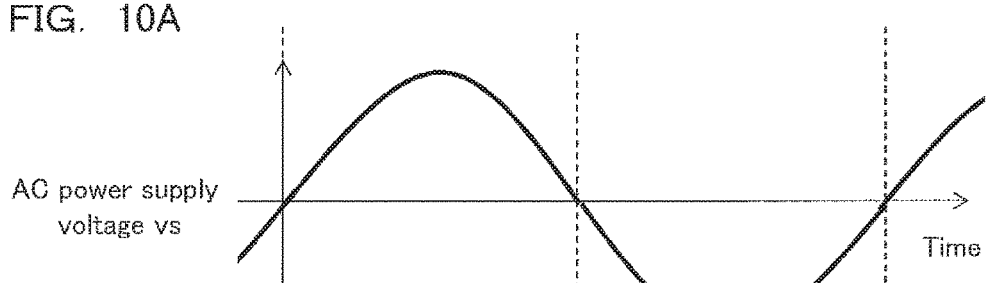
FIGS. 10A-10D are waveform charts of the power supply voltage, the circuit current, and driving pulses for the MOSFETs, respectively, under the fast switching control.
Figure 10B:
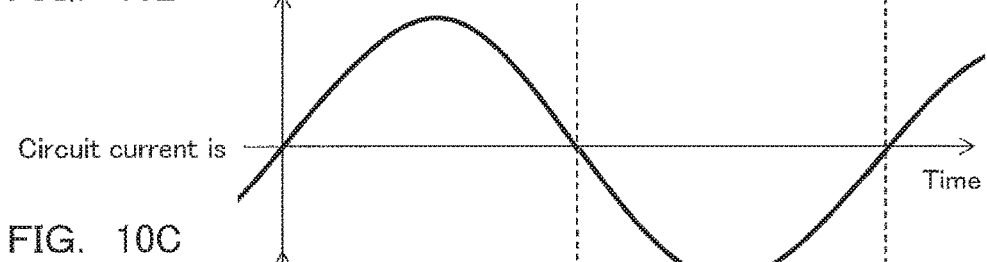
Figure 10C:
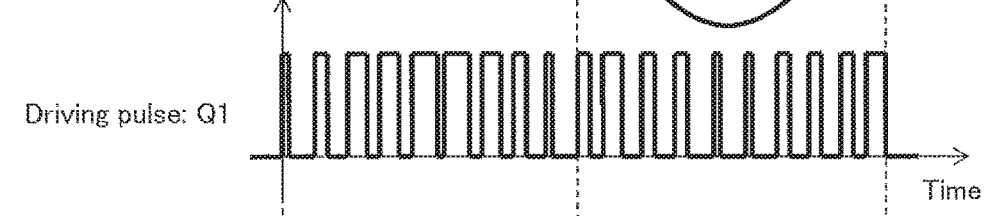
Figure 10D:
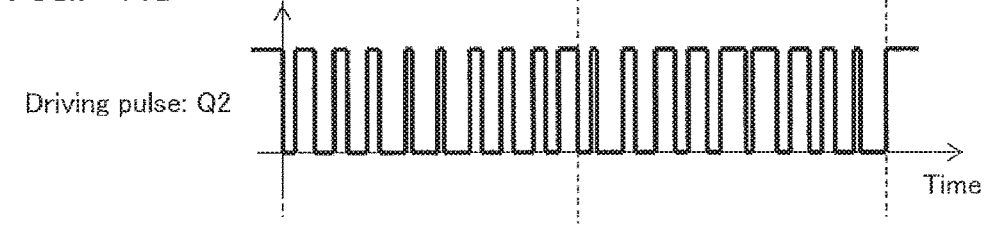

FIG. 10A shows a waveform of the instantaneous value "vs" of the AC power supply voltage and FIG. 10B shows a waveform of the circuit current "is." FIG. 10C shows a waveform of the driving pulse for the MOSFET Q1 and FIG. 10D shows a waveform of the driving pulse for the MOSFET Q2.

As shown in FIG. 10A, the instantaneous value "vs" of the AC power supply voltage substantially indicates a sinusoidal waveform.

In the fast switching operation, if the power supply voltage has the positive polarity, for example, the MOSFET Q2 is turned on and the MOSFET Q1 is turned off while the power-factor correction is in operation, to flow the power-factor correction current "isp." Next, the MOSFET Q2 is turned off and the MOSFET Q1 is turned on. In this way, the ON/OFF states of the MOSFETs Q1, Q2 are switched depending on whether or not the power factor correction is in operation, because the operation is under the synchronous rectification control. In order to execute simple fast switching operation, the MOSFET Q2 may be switched at a fixed frequency, with the MOSFET Q1 being in a normally OFF-state.

However, in this case, if the MOSFET Q1 is also in an OFF-state while the MOSFET Q2 is in an OFF-state, the current will flow through the parasitic diode D3 of the MOSFET Q1. As described above, the parasitic diode has poor characteristics to have a large voltage drop, thereby causing a large conduction loss. In the present invention, the MOSFET Q1 is turned on while the MOSFET Q2 is in an OFF-state, to execute the synchronous rectification for reducing a conduction loss.

The circuit current "is" (instantaneous value) flowing through the DC power supply unit 1 can be expressed by Equation (2) as follows.

$$i_s = \frac{\sqrt{2} \cdot V_s \cdot \sin(\omega t)}{K_p \cdot V_d}, \tag{2}$$

where $i_s$: Circuit-current instantaneous value,
$V_s$: Power-supply-voltage effective value,
$K_p$: Current control gain, and
$V_d$: DC voltage.

Further, Equation (2) can be rewritten to obtain Equation (3) as follows.

$$K_p \cdot i_s = \frac{\sqrt{2} \cdot V_s \cdot \sin(\omega t)}{V_d}. \tag{3}$$

Equation (4) shows a relation between the circuit current "is" (instantaneous value) and the circuit current effective value "Is." Note that "is" (instantaneous value) is a value that is detected by the shunt resistor R1, and the circuit-current effective value "Is" is a value detected by the current detector 11.

$$i_s = \sqrt{2} \cdot I_s \cdot \sin(\omega t) \tag{4}$$

where $I_s$: Circuit-current effective value.

Equation (3) can be transformed and substituted with Equation (4), to obtain Equation (5) as follows.

$$K_p = \frac{\sqrt{2} \cdot V_s \cdot \sin(\omega t)}{V_d \times \sqrt{2} \cdot I_s \cdot \sin(\omega t)} = \frac{V_s}{V_d} \cdot \frac{1}{I_s} = \frac{1}{a \cdot I_s}. \tag{5}$$

When the inverse of the step-up ratio is put at the right side, following Equation (6) can be obtained.

$$K_p \cdot I_s = \frac{1}{a}, \tag{6}$$

where $I_s$: Circuit-current effective value, and
α: Step-up ratio.

Further, the duty "d" of the MOSFET can be expressed by Equation (7).

$$d = 1 - K_p \cdot |i_s| = 1 - \frac{|i_s|}{a \cdot I_s}, \tag{7}$$

where $i_s$: Circuit-current instantaneous value.

From the above results, "Kp×Is" shown in Equation (6) can be controlled to step up "a" times the effective value of the AC power supply voltage Vs, and the duty (conduction ratio) "d" of the MOSFET at that time can be given by Equation (7).

Figure 11:
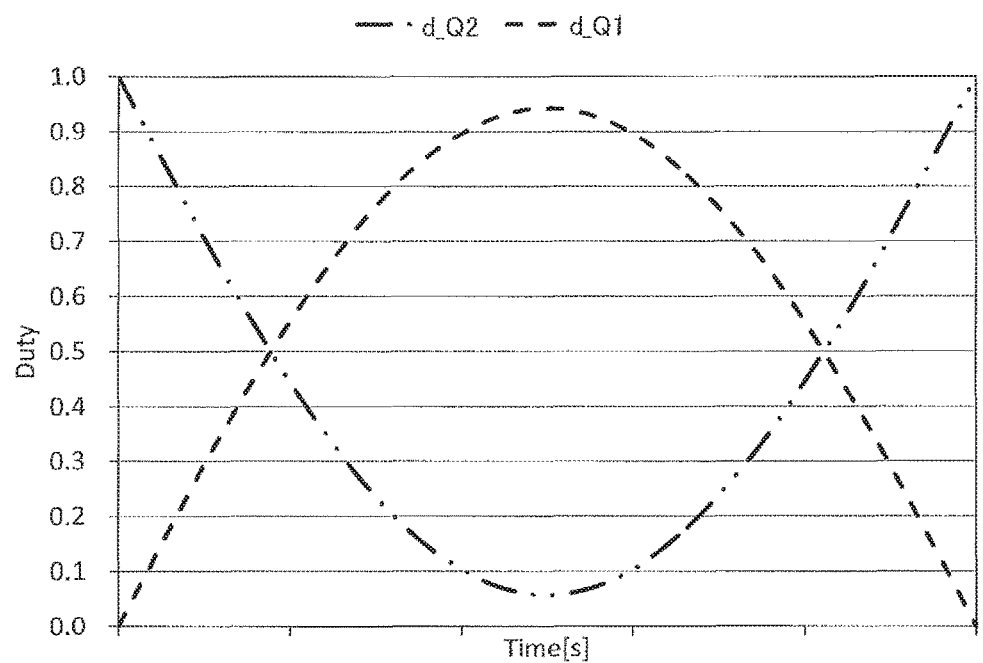
FIG. 11 is a chart showing a duty-cycle relation between the MOSFETs under the fast switching control.

FIG. 11 is a chart showing the ON-duty relation between the driving pulses for the MOSFET Q2 and the MOSFET Q1 during a half-cycle (positive polarity) of the power supply voltage. The vertical axis in FIG. 11 indicates the ON-duty and the horizontal axis indicates the time for a half cycle of the power supply voltage having a positive polarity.

The ON-duty of the driving pulse for the MOSFET Q1 indicated by a broken line is proportional to the AC power supply voltage Vs. The ON-duty of the driving pulse for the MOSFET Q2 indicated by a two-dot chain line is obtained by subtracting the ON-duty of the driving pulse for the MOSFET Q1 from 1.0.

In FIG. 11, as the circuit current "is" increases, the duty "d" of the driving pulse for the MOSFET Q2, which executes switching operation for flowing the power-factor correction current, decreases as expressed in Equation (7), and reversely, as the circuit current "is" decreases, the duty "d" of the driving pulse for the MOSFET Q2 increases. The duty "d" of the driving pulse for the MOSFET Q1, which executes the synchronous rectification, has a reverse characteristic to the duty "d" of the driving pulse for the MOSFET Q2.

Figure 12:
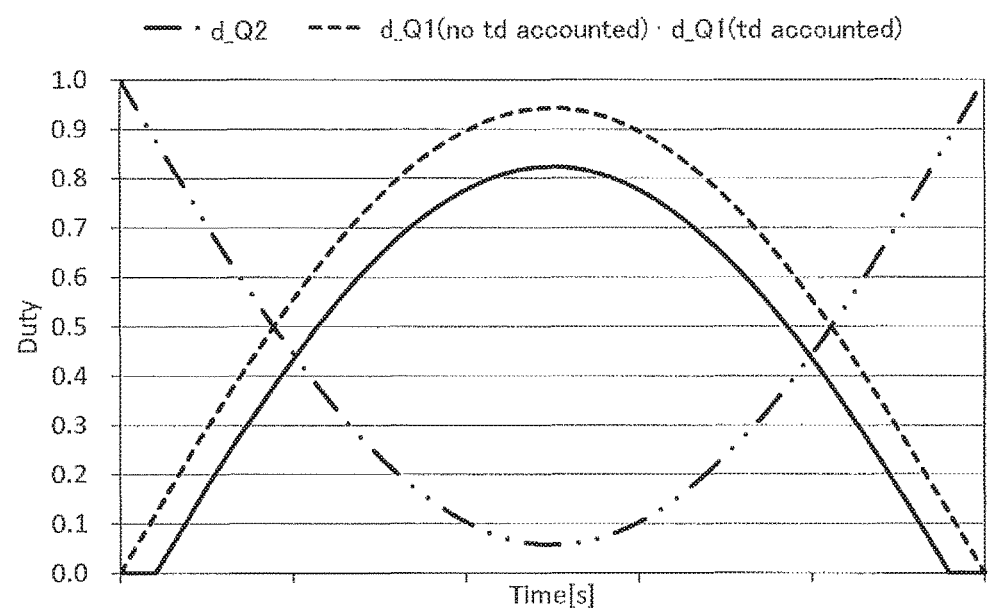
FIG. 12 is a chart showing the duty-cycle relation between the MOSFETs, with the dead time accounted, under the fast switching control.

Note that a dead time needs to be accounted in practice to avoid short-circuiting between the upper and lower arms. FIG. 12 is a chart during a half cycle (positive polarity) of the power supply voltage, appended with the ON-duty of the driving pulse for MOSFET Q2 in a solid line with the dead time accounted. The vertical axis in FIG. 12 indicates the ON-duty and the horizontal axis indicates the time for a half cycle of the AC power supply voltage Vs having a positive polarity.

As shown here, if a predetermined dead time is added, the duty of the driving pulse for the MOSFET Q2 is decreased by that for the dead time.

Figure 13:
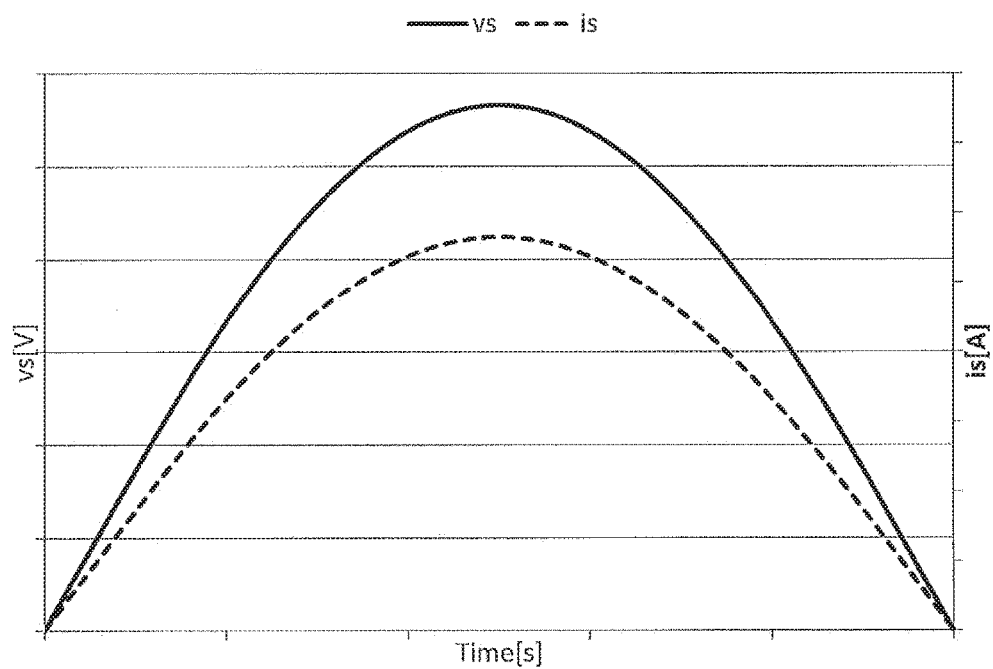
FIG. 13 is a chart showing the relation between the AC power supply voltage and the circuit current, under the fast switching control.

FIG. 13 is a chart showing a relation between the instantaneous value "vs" of the AC power supply voltage Vs and the circuit current "is" (instantaneous value). The solid line indicates the instantaneous value "vs" of the AC power supply voltage Vs and the broken line indicates the instantaneous value of the circuit current "is." The horizontal axis in FIG. 13 indicates the time for a half cycle of the power supply voltage having a positive polarity.

As shown in FIG. 13, the fast switching control allows both the instantaneous value "vs" of the AC power supply voltage Vs and the circuit current "is" (instantaneous value) to have substantially sinusoidal waveforms, thereby correcting the power factor.

The duty $d_{Q2}$ of the MOSFET Q2 is expressed in Equation (8) as follows.

$$d_{Q2}=1-K_p \cdot |i_s| \qquad (8).$$

The duty $d_{Q1}$ of the MOSFET Q1 is expressed in Equation (9) as follows.

$$d_{Q1}=1-d_{Q2} \qquad (9).$$

In addition, in view of the relation between the power supply voltage and the current, the circuit current "is" is controlled to have a sinusoidal waveform so as to keep the power factor in a good condition. Note that this assumes a state where the reactor L1 has a small inductance and the current has no phase lag relative to the power supply voltage. If the reactor L1 has a large inductance and the current phase lags the voltage phase, the duty "d" may be set with the current phase accounted.

Figure 14:
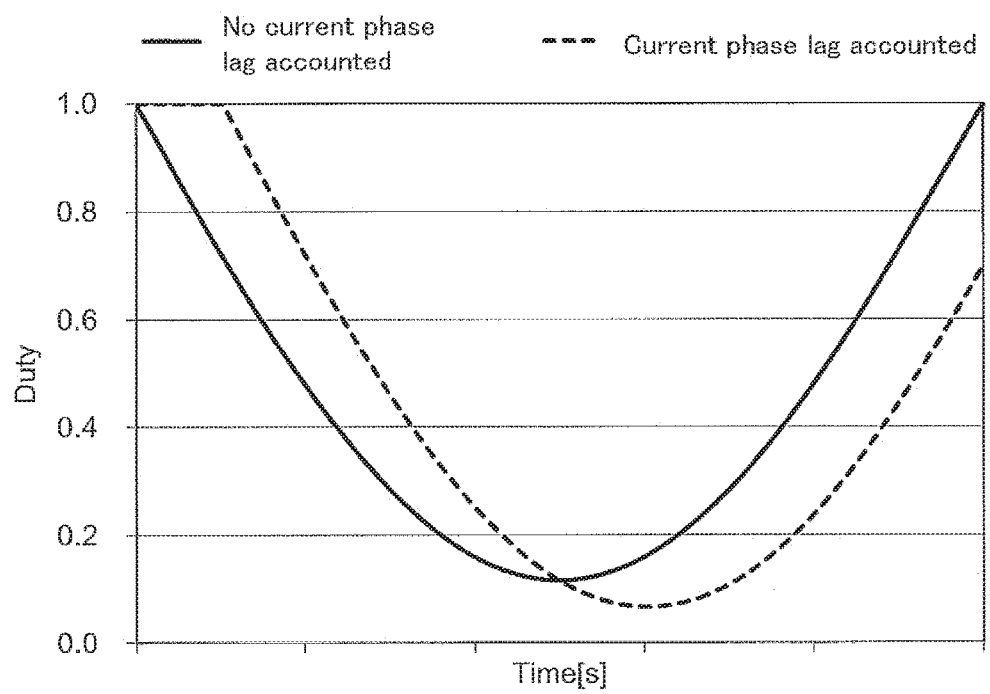
FIG. 14 is a chart, in a case of the AC power supply voltage having a positive polarity, showing the duty cycle of the MOSFET with a lag accounted of the current phase due to the reactor.

FIG. 14 is a chart, in a case of the AC power supply voltage Vs having a positive polarity, showing the duty of the MOSFET Q2 with a lag accounted of the current phase due to the reactor L1. The vertical axis in FIG. 14 indicates the duty of the MOSFET Q2 and the horizontal axis indicates the time for a half cycle of the power supply voltage having a positive polarity.

The solid line indicates the duty of the MOSFET Q2 with no lag accounted of the current phase due to the reactor L1. The dashed line indicates the duty of the MOSFET Q2 with the lag accounted of the current phase due to the reactor L1. Such a control allows for controlling the current to have a sinusoidal waveform, even if the reactor L1 has a large inductance.

Hereinabove, a description has been given of the case where the fast switching is combined for execution with the synchronous rectification. Note that the fast switching may also be combined with the diode rectification, as described before. That is, in a case of the AC power supply voltage Vs having a positive polarity, only the MOSFET Q2 may be used for the fast switching, with the MOSFET Q1 kept in a normally-OFF state. Such a control also allows for gaining the effect of the corrected power factor.

<Partial Switching Operation>

As described above, the fast switching operation allows the circuit current "is" to have a waveform formed in a sine wave, thereby securing a high power factor. However, the higher the switching frequency is, the larger the switching loss is.

As the input to the circuit increases, the harmonic current also increases to make satisfying the regulation value for the higher harmonic current particularly difficult, and then securing a high power factor becomes more important as the input current increases. On the contrary, if the input is small, the harmonic current is also small to occasionally have no need for securing a high power factor more than required. That is, it can be said in other words that an optimum power factor may be secured to reduce the harmonic currents by taking efficiency into account according to a load condition.

Therefore, a partial switching operation may be executed for a case of correcting the power factor while avoiding a switching loss from increasing.

The partial switching operation is an operation mode of not correcting the power factor at a predetermined frequency as with a fast switching operation, but correcting the power factor two or more times at predetermined phases during a half cycle of the AC power supply voltage Vs to step up the DC voltage Vd and correct the power factor. The smaller number of times of switching the MOSFETs Q1, Q2 as compared with the case of the fast switching operation allows for reducing a switching loss. Hereinbelow, a description will be given of the partial switching operation with reference to FIG. 15.

FIGS. 15A-15D are charts for a cycle of the AC power supply voltage Vs having a positive polarity, illustrating relations of driving pulses for the MOSFETs Q1, Q2 with the AC power supply voltage Vs and the circuit current "is."

FIG. 15A shows the instantaneous value "vs" of the AC power supply voltage and FIG. 15B shows the circuit current "is". FIG. 15C shows the driving pulse for the MOSFET Q2 and FIG. 15D shows the drive pulse for the MOSFET Q1.

As shown in FIG. 15A, the instantaneous value "vs" of the AC power supply voltage has a substantially sinusoidal waveform.

A dot-and-dash line in FIG. 15B indicates an ideal circuit current "is" in a substantially sinusoidal waveform. In this case, the power factor is corrected most.

Here, it is assumed that a point P1 on the ideal current curve, for example, has a gradient of di(P1)/dt. Next, while the MOSFET Q2 is turned on from a state of the current having a zero value for a time ton1_Q2, the current is assumed to have a gradient of di(ton1_Q2)/dt. Further, after being turned on for the time ton1_Q2, the MOSFET Q2 is turned off for a time toff_Q2 and the current is assumed to have a gradient of di(toff1_Q2)/dt. During the time, a control is made so that an average value of di(ton1_Q2)/dt and di(toff1_Q2)/dt is equal to the gradient of di(P1)/dt at the point P1.

Then, it is assumed that the current has a gradient of di(P2)/dt at a point P2 as with the point P1. Next, while the MOSFET Q2 is turned on for a time ton2_Q2, the current is assumed to have a gradient of di(ton2_Q2)/dt, and while the MOSFET Q2 is turned off for a time toff2_Q2, the current is assumed to have a gradient of di(toff2_Q2)/dt. As is the case with the point P1, a control is made so that average value of di(ton2_Q2)/dt and di(toff2_Q2)/dt is equal to the gradient of di(P2)/dt at the point P2. From this point on, such a control will be repeated. In this case, the larger the number of times of switching the MOSFET Q2 is, the more the current curve can be approximated to the ideal sine wave.

Note that the reason that the MOSFET Q1 and the MOSFET Q2 are switched complementarily is because the partial switching operation is combined for execution with the synchronous rectification operation.

Depending on a situation, the partial switching operation may be combined for execution with the diode rectification operation.

<Switching of Control Mode>

The DC power supply device 1 of the present invention can execute the diode rectification control, the synchronous rectification control, the partial switching control, and the fast switching control. For example, depending on the device to be used, required performance may change according to the load condition such as a range for focusing on achieving high efficiency, and a range for focusing on stepping up the voltage and correcting the power factor. Therefore, the modes for executing the four kinds of control as described above can be selectively switched based on predetermined threshold values to more suitably achieve high efficiency and reduce harmonic currents at the same time.

FIG. 16 is a chart illustrating switching of the operation modes of the DC power supply unit in accordance with the magnitude of the load. In this chart, a first threshold value is abbreviated as "Threshold #1" and a second threshold value is abbreviated as "Threshold #2". In addition, first to eighth control methods are simply abbreviated as "#1" to "#8."

The first control method switches based on the first predetermined threshold value between a mode of executing the synchronous rectification control and a mode of executing the synchronous rectification control along with the partial switching control. Note that the partial switching control is abbreviated as "Partial SW" in the chart.

The second control method switches based on the first predetermined threshold value between a mode of executing the synchronous rectification control and a mode of executing the synchronous rectification control along with the fast switching control. Note that the fast switching control is abbreviated as "Fast SW" in the chart.

The third control method switches based on the first and second predetermined threshold values between a mode of executing the synchronous rectification control, a mode of executing the synchronous rectification control along with the partial switching control, and a mode of executing the synchronous rectification control along with the fast switching control.

The fourth control method switches based on the first predetermined threshold value between a mode of executing the synchronous rectification control and a mode of executing the diode rectification control along with the partial switching control.

The fifth control method switches based on the first predetermined threshold value between a mode of executing the synchronous rectification control and a mode of executing the diode rectification control along with the fast switching control.

The sixth control method switches based on the first and second predetermined threshold values between a mode of executing the synchronous rectification control, a mode of executing the diode rectification control along with the partial switching control, and a mode of executing the diode rectification control along with the fast switching control.

The seventh control method switches based on the first and second predetermined threshold values between a mode of executing the synchronous rectification control, a mode of executing the diode rectification control along with the partial switching control, and a mode of executing the synchronous rectification control along with the fast switching control.

The eighth control method switches based on the first and second predetermined threshold values between a mode of executing the synchronous rectification control, a mode of executing the synchronous rectification control along with the partial switching control, and a mode of executing the diode rectification control along with the fast switching control.

For example, if the primary purpose is to improve efficiency as well as to reduce harmonic currents and step up a voltage, the first to third control methods may be used for switching a mode. Also, if the primary purpose is not to improve efficiency but to reduce harmonic currents and step up a voltage, the fourth to sixth control methods may be used for switching a mode. For example, in the case of combining the partial switching operation or the fast switching operation with the synchronous rectification operation, two MOSFETs need to be controlled during a half cycle of the AC power supply voltage, and then the control is rather complicated. However, if the combination is made with the diode rectification, only one MOSFET needs to be controlled during a half cycle of the AC power supply voltage, and this leads to a simpler control. In short, a suitable control may be selected depending on the requirement such as improving efficiency, reducing harmonic currents, or improving controllability.

Note that a threshold value that triggers switching a control can be, for example, a circuit current detected by the current detector 11. Instead, load information may be used that is detected by the load detector 15. If the load H is a motor or an inverter, a motor current, a rotational speed of the motor, a modulation factor, or a DC voltage may be used, for example, as the load information.

In addition, if the control is switched between two modes as in the first, the second, the fourth, or the fifth control method, single threshold value (a first threshold value) may be enough. If the control is switched between three modes as in the third, the sixth, the seventh, or the eighth control method, two threshold values (first and second threshold values) need to be prepared. Further, the first and second threshold values are linked to the magnitude of the load. That is, there is a relation such that the second threshold value is greater than the first threshold value.

For example, the third control method causes the synchronous rectification operation in a range lower than the first threshold value, the synchronous rectification operation along with the partial switching operation in a range greater than or equal to the first threshold value but less than the second threshold value, and the synchronous rectification operation along with the fast switching operation in a range greater than or equal to the second threshold value. The same is true for other modes.

Furthermore, in a case where the partial switching operation in service is switched to the fast switching operation as in the third, the sixth, the seventh, or the eighth control method, a DC voltage may vary. To avoid this, an adjustment is made for an ON-time at the moment when the partial switching operation is switched to the fast switching operation, so that the peak current during the fast switching operation is smaller than that during the partial switching operation.

Figures 17A, 17B:
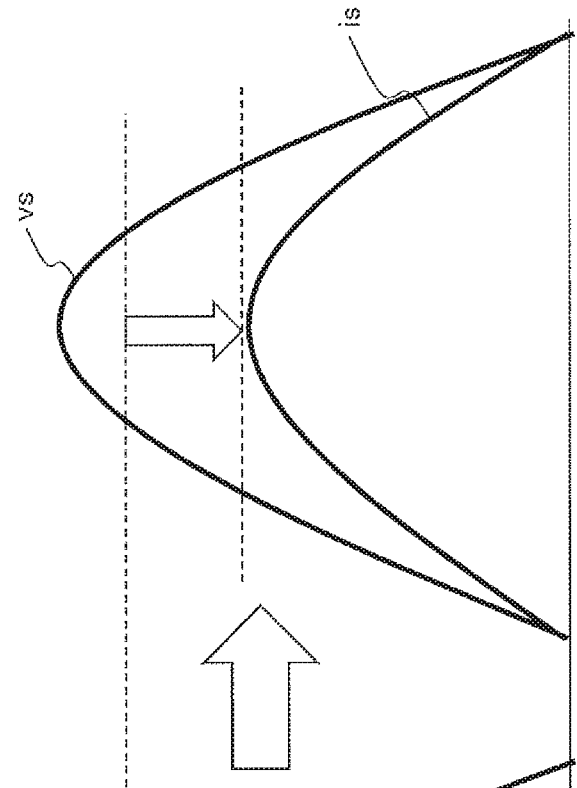
FIGS. 17A and 17B are charts illustrating current waveforms in a case of switching from the partial switching control to the fast switching control.

FIGS. 17A and 17B are charts illustrating current waveforms in a case of switching from the partial switching control to the fast switching control.

FIG. 17A schematically illustrates the instantaneous value "vs" of the AC power supply voltage and the input current "Is" under the partial switching control.

FIG. 17B schematically illustrates the instantaneous value "vs" of the AC power supply voltage and the input current "is" after the control is switched to the fast switching control. The peak of the current "is" in this case is smaller than that of the current "is" in FIG. 17A. Thus, switching with the ON-time adjusted allows for reducing variation of the DC voltage. This is because the power factor is better under the fast switching control than under the partial switching control to have a smaller current. That is, if the fast switching control is switched to have the same current amplitude as that during the partial switching control, the DC voltage is excessively stepped up. This allows for reducing variation of the DC voltage Vd.

Similarly, in a case of switching from the fast switching control to the partial switching control, switching with the ON-time adjusted so that the amplitude of the current increases, contrary to the preceding case, allows for preventing the DC voltage from decreasing, again contrary to the preceding case.

Moreover, switching from one to another at a zero-crossing timing of the power supply voltage allows for stably switching a control.

<Operation of DC Power Supply Unit and Air Conditioner>

Figure 18:
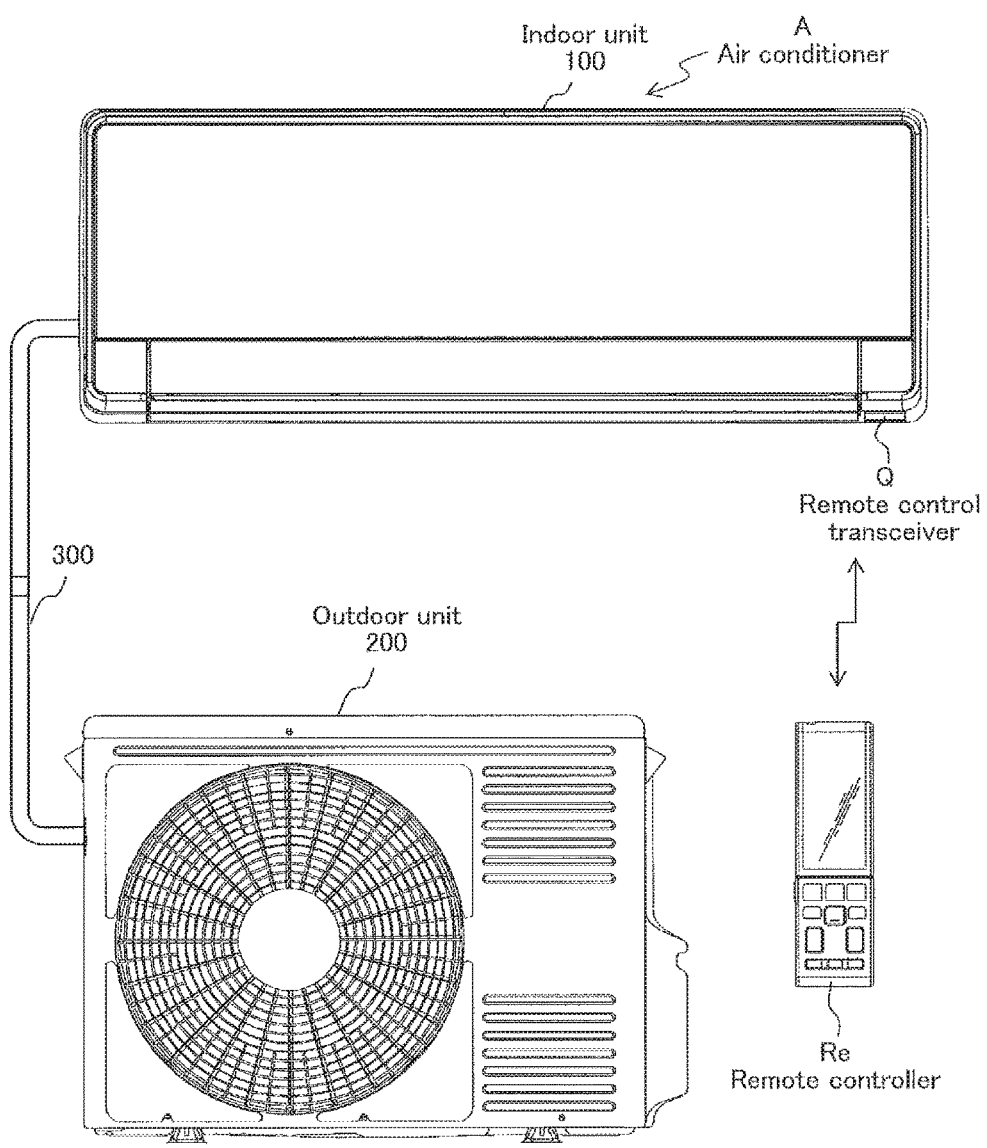
FIG. 18 is a front view of an indoor unit, an outdoor unit, and a remote controller of an air conditioner in the present embodiment.

FIG. 18 is a front view of an indoor unit, an outdoor unit, and a remote controller of an air conditioner in the present embodiment.

As shown in FIG. 18, the air conditioner A is a so-called room air conditioner and includes an indoor unit 100, an outdoor unit 200, a remote controller Re, and a DC power supply unit which is not shown (see FIG. 1). The indoor unit 100 and the outdoor unit 200 are connected by a refrigerant piping 300 to air-condition a room, where the indoor unit 100 is installed, by a well-known refrigeration cycle. In addition, the indoor unit 100 and outdoor unit 200 are arranged so as to transmit and receive information with each other via a communication cable (not shown). Further, the outdoor unit 200 is connected by a wiring (not shown) through the indoor unit 100 for supplying the AC voltage. The DC power supply unit is included in the outdoor unit 200 to convert the AC power supplied through the indoor unit 100 to the DC power.

The remote controller Re can be operated by a user to transmit an infrared signal to the remote control transceiver Q of the indoor unit 100. The contents of this infrared signal include an instruction, such as starting operation, changing a temperature setting, setting a timer, changing a operation mode, and stopping operation. The air conditioner A air-conditions based on the instructions of such infrared signals in a cooling mode, a heating mode, or a dehumidification mode. In addition, the indoor unit 100 sends data such as room temperature information, humidity information, and electricity expense information through the remote control transceiver Q to the remote controller Re.

A description will be given of an operation flow of the DC power supply unit mounted on the air conditioner A. The DC power supply unit is intended to improve operation efficiency, reduce the harmonic currents by correcting the power factor, and step up the DC voltage Vd. The unit has four operating modes as described above: i.e., the diode rectification operation, the synchronous rectification operation, the fast switching operation, and the partial switching operation.

For example, assuming an inverter or a motor of the air conditioner A as the load H, if the load is small and efficiency-oriented operation is required, the DC power supply unit is preferably operated in the synchronous rectification mode.

If the load increases to have a need for stepping up the voltage and securing the power factor, the DC power supply unit is preferably made to execute the fast switching operation. Also, if the load is not so large but there is a need for stepping up the voltage and securing the power factor as in the rated operation of the air conditioner A, the DC power supply unit is preferably made to execute the partial switching operation. Note that the partial switching operation or the fast switching operation can be combined, while in operation, with either one of the diode rectification and the synchronous rectification.

Figure 19:
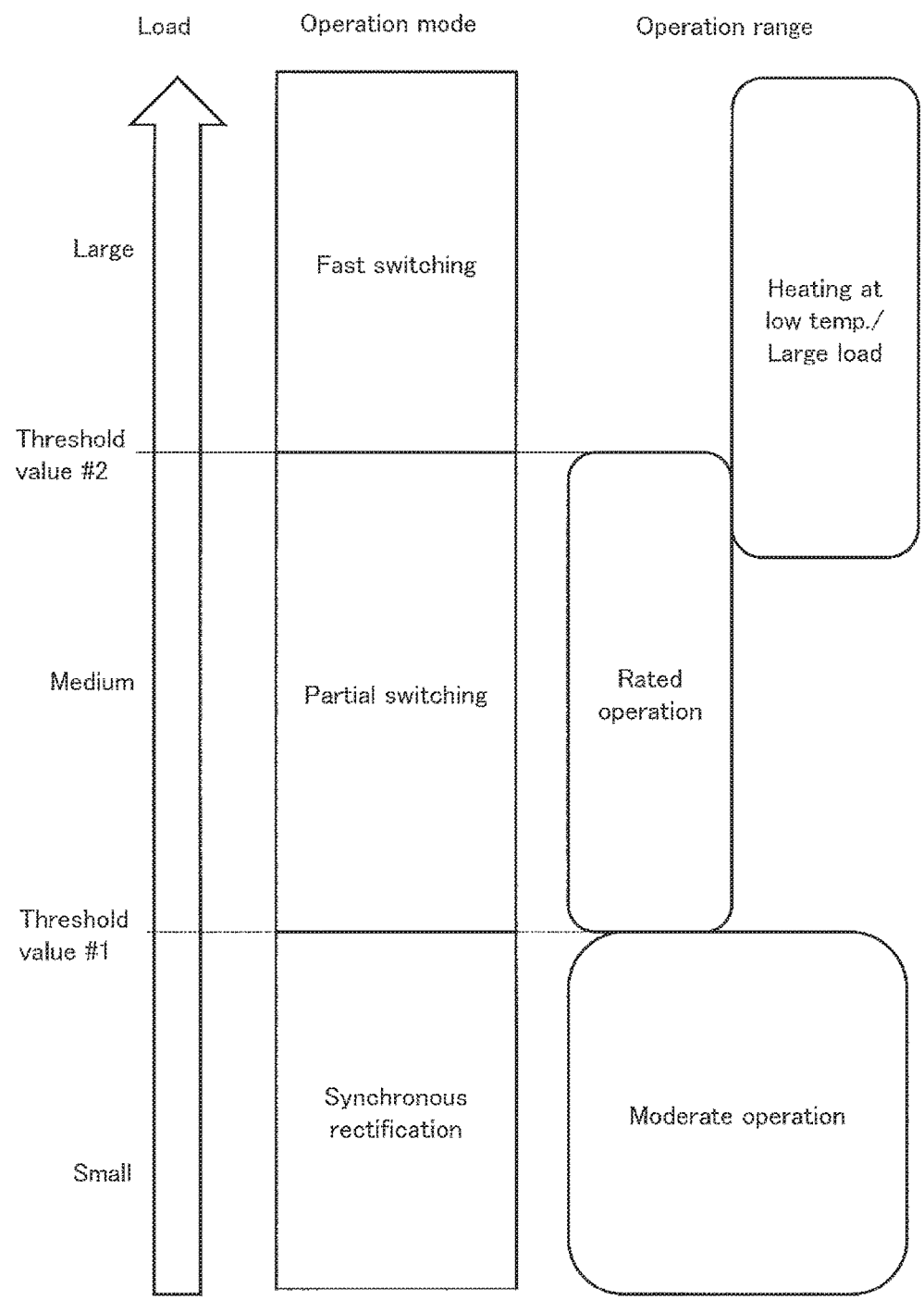
FIG. 19 is a schematic chart illustrating how to switch the operating modes of the DC power supply unit and the operating ranges of the air conditioner in accordance with the magnitude of the load.

FIG. 19 is a schematic chart illustrating how to switch the operating modes of the DC power supply unit 1 and the operating ranges of the air conditioner A in accordance with the magnitude of the load.

Setting the threshold values #1, #2 to the load and assuming the air conditioners A as a device, the DC power supply unit operates in the synchronous rectification mode in a moderate range where the load is small, operates in the partial switching mode (combined with either the diode rectification or the synchronous rectification) in a rated operation range, and operates in the fast switching mode (combined with either the diode rectification or the synchronous rectification) if necessary.

In a heating-at-a-low-temperature operation range where the load is still larger than that in the rated operation, the DC power supply unit 1 operates in the fast switching mode, and operates in the partial switching mode (combined with either the diode rectification or the synchronous rectification) where applicable.

As described above, the DC power supply unit can switch to a suitable operation mode in accordance with the operation range of the air conditioner A to reduce the harmonic currents while achieving highly efficient operation.

Note that if the load H is an inverter or a motor, a parameter for determining the magnitude of the load can be a current flowing through the inverter or the motor, the modulation factor of the inverter, or the rotational speed of the motor. Alternatively, the circuit current "is" flowing through the DC power supply unit may be used to determine the magnitude of the load H. Further, the DC voltage may be used to determine the magnitude of the load.

For example, the DC power supply unit may operate in the synchronous rectification mode if the magnitude of the load is less than or equal to the threshold value #1, and operate in the partial switching mode (combined with either the diode rectification or the synchronous rectification) if the magnitude of the load exceeds the threshold value #1. Alternatively, the DC power supply unit may operate in the fast switching mode (combined with either the diode rectification or the synchronous rectification) if the magnitude of the load exceeds the threshold value #2, and operate in the partial switching mode (combined with either the diode rectification or the synchronous rectification) if the magnitude of the load is less than or equal to the threshold value #2.

As described above, the DC power supply unit can be switched to a suitable operation mode in accordance with the magnitude of the load to reduce the harmonic currents while achieving highly efficient operation.

In the present embodiment, a description has been given of an example using a super junction MOSFET as the MOSFETs Q1, Q2. A Silicon Carbide MOSFET (SiC- MOSFET) or a switching element using Gallium Nitride (GaN) can be used as the MOSFETs Q1, Q2 to achieve more efficient operation.

Thus, the air conditioner A can include the DC power supply unit of the present embodiment to improve energy efficiency (i.e., APF) and reliability. The DC power supply unit of the present embodiment can also be equipped into a device other than the air conditioner to improve efficiency and reliability.

The present invention is not limited to the embodiments described above, and includes various modifications. For example, embodiments hereinabove are described in detail in order to illustrate the present invention, and are not necessarily limited to include entire configurations as described. A part of the configuration of an embodiment may be replaced by the configuration of another embodiment, and/or the configuration of an embodiment may be added with the configuration of another embodiment. In addition, a part of the configuration of each embodiment may be removed, or added with and/or replaced by another configuration.

In addition, an element having a fast Trr is used as the MOSFETs Q1, Q2 and specifically an element having the Trr of 300 ns or less can be used to operate with high efficiency.

Further, the smaller the ON-resistance of the MOSFETs Q1, Q2 is, the higher the effect of the synchronous rectification is. Specifically, the ON-resistance of 0.1Ω or less can be used to operate with high efficiency.

The bridge rectifier circuit 10 is not limited to be configured with the parasitic diodes of the MOSFETs Q1, Q2 and the diodes D1, D2, and may be configured with diodes which are respectively connected in parallel to the MOSFETs Q1, Q2 and combined with the diodes D1, D2.

Each configuration, function, process, and/or processing means described above may be implemented in part or entirely by hardware such as an integrated circuit. Each configuration and/or function described above may be implemented by software by a processor interpreting and executing programs for implementing the respective functions. Information such as program for implementing respective functions, tables, and files can be stored in a recording device such as a memory, and a hard disk, or a recording medium such as a flash memory card, and a DVD (Digital Versatile Disk).

In each embodiment, the control lines and information lines are shown for the purpose of illustration, and all control lines and information lines in the product are not necessarily shown. In fact, it may be safe to say that almost all components are connected with one another.

The invention claimed is:

1. A DC power supply unit comprising:
a rectifier circuit that is connected to an AC power supply and has first to fourth diodes;
a first switching element that either includes the third diode as a parasitic diode or is connected in parallel with the third diode, has a withstand voltage characteristic with respect to the direction of the third diode being turned off, and has a saturation voltage lower than forward voltage drops of the first to fourth diodes;
a second switching element that either includes the fourth diode as a parasitic diode or is connected in parallel with the fourth diode, has a withstand voltage characteristic with respect to the direction of the fourth diode being turned off, and has a saturation voltage lower than forward voltage drops of the first to fourth diodes;
a reactor that is arranged between the AC power supply and the rectifier circuit;
a smoothing capacitor that is connected to an output side of the rectifier circuit and smoothes a voltage applied by the rectifier circuit; and
a converter controller that executes a diode rectification control that uses the first to fourth diodes, a synchronous rectification control that switches between the first and second switching elements, so that when the first switching element is ON the second switching element is OFF and when the second switching element is ON the first switching element is OFF, in synchronization with a polarity of the voltage of the AC power supply, a partial switching control that repeats partially short-circuiting the reactor to the power supply multiple times in a half cycle of the AC power supply, or a fast switching control that short-circuits the reactor at a predetermined frequency over a full AC cycle.

2. The DC power supply unit according to claim 1, wherein the converter controller switches based on a predetermined threshold value between a mode of executing the synchronous rectification control and a mode of executing the synchronous rectification control along with the partial switching control.

3. The DC power supply unit according to claim 2, wherein the converter controller uses one of a circuit current, a motor current, a rotational speed of the motor, a modulation factor, and a DC voltage as a threshold value.

4. The DC power supply unit according to claim 2, wherein the converter controller switches a control at a zero-crossing timing of an AC voltage which is applied by the AC power supply.

5. The DC power supply unit according to claim 1, wherein the converter controller switches based on a predetermined threshold value between a mode of executing the synchronous rectification control and a mode of executing the synchronous rectification control along with the fast switching control.

6. The DC power supply unit according to claim 5, wherein the converter controller switches a control at a zero-crossing timing of an AC voltage which is applied by the AC power supply.

7. The DC power supply unit according to claim 1, wherein the converter controller switches based on predetermined threshold values between a mode of executing the synchronous rectification control, a mode of executing the synchronous rectification control along with the partial switching control, and a mode of executing the synchronous rectification control along with the fast switching control.

8. The DC power supply unit according to claim 7, wherein the converter controller switches either from the partial switching control to the fast switching control or from the fast switching control to the partial switching control so that a DC voltage does not vary.

9. The DC power supply unit according to claim 7, wherein the converter controller switches a control at a zero-crossing timing of an AC voltage which is applied by the AC power supply.

10. The DC power supply unit according to claim 1, wherein the converter controller switches based on a predetermined threshold value between a mode of executing the synchronous rectification control and a mode of executing the diode rectification control along with the partial switching control.

11. The DC power supply unit according to claim 1,
wherein the converter controller switches based on a predetermined threshold value between a mode of executing the synchronous rectification control and a mode of executing the diode rectification control along with the fast switching control.

12. The DC power supply unit according to claim 1,
wherein the converter controller switches based on predetermined threshold values between a mode of executing the synchronous rectification control, a mode of executing the diode rectification control along with the partial switching control, and a mode of executing the diode rectification control along with the fast switching control.

13. The DC power supply unit according to claim 12,
wherein the converter controller switches either from the partial switching control to the fast switching control or from the fast switching control to the partial switching control so that a DC voltage does not vary.

14. The DC power supply unit according to claim 1,
wherein the converter controller switches based on predetermined threshold values between a mode of executing the synchronous rectification control, a mode of executing the diode rectification control along with the partial switching control, and a mode of executing the synchronous rectification control along with the fast switching control.

15. The DC power supply unit according to claim 14,
wherein the converter controller switches either from the partial switching control to the fast switching control or from the fast switching control to the partial switching control so that a DC voltage does not vary.

16. The DC power supply unit according to claim 1,
wherein the converter controller switches based on predetermined threshold values between a mode of executing the synchronous rectification control, a mode of executing the synchronous rectification control along with the partial switching control, and a mode of executing the diode rectification control along with the fast switching control.

17. The DC power supply unit according to claim 16,
wherein the converter controller switches either from the partial switching control to the fast switching control or from the fast switching control to the partial switching control so that a DC voltage does not vary.

18. The DC power supply unit according to claim 1,
wherein the converter controller switches a control at a zero-crossing timing of an AC voltage which is applied by the AC power supply.

19. The DC power supply unit according to claim 1,
wherein the first and second switching elements use one of a super junction MOSFET, a Silicon Carbide MOSFET, and a Gallium Nitride.

20. The DC power supply unit according to claim 1, wherein
when the first switching element is in an OFF-state, the second switching element is in an ON-state,
the second switching element is turned on at a zero-crossing time when a polarity of the AC power supply voltage switches from positive to negative, and
the second switching element is turned off at a time when the polarity of the AC power supply voltage switches from negative to positive.

* * * * *